US006701459B2

(12) United States Patent
Ramanathan et al.

(10) Patent No.: US 6,701,459 B2
(45) Date of Patent: Mar. 2, 2004

(54) ROOT-CAUSE APPROACH TO PROBLEM DIAGNOSIS IN DATA NETWORKS

(75) Inventors: Srinivas Ramanathan, San Jose, CA (US); Balamurugan Vaidhinathan, Chennai (IN)

(73) Assignee: eGurkha Pte Ltd (SG)

( * ) Notice: Subject to any disclaimer, the term of this patent is extended or adjusted under 35 U.S.C. 154(b) by 639 days.

(21) Appl. No.: 09/750,890

(22) Filed: Dec. 27, 2000

(65) Prior Publication Data

US 2002/0083371 A1 Jun. 27, 2002

(51) Int. Cl.[7] ................................................. H02H 3/05
(52) U.S. Cl. .............................. 714/37; 714/4; 709/224
(58) Field of Search ............................... 714/37, 4, 38, 714/39, 47; 709/223, 224, 229, 230

(56) References Cited

U.S. PATENT DOCUMENTS

| 5,193,143 A | * | 3/1993 | Kaemmerer et al. ........... 706/45 |
| 5,276,789 A |   | 1/1994 | Besaw et al. ................ 395/140 |
| 5,778,049 A |   | 7/1998 | Young et al. ................... 379/10 |
| 5,796,951 A |   | 8/1998 | Hamner et al. ......... 395/200.53 |
| 5,864,662 A | * | 1/1999 | Brownmiller et al. ......... 714/43 |
| 6,072,777 A | * | 6/2000 | Bencheck et al. ........... 370/244 |
| 6,532,554 B1 | * | 3/2003 | Kakadia ....................... 714/43 |

* cited by examiner

*Primary Examiner*—Dieu-Minh Le
(74) *Attorney, Agent, or Firm*—Law Offices of Terry McHugh

(57) ABSTRACT

A method of monitoring a data network includes storing topology information that identifies interconnections and interdependencies among network components, as well as links between websites and the components. Each component is also mapped to relevant protocol layers of a hierarchy of protocol layers that are ranked according to dependencies among the protocol layers in implementing functions. Network test measurements are also mapped to the appropriate protocol layers. Based upon the topology information and the various forms of mapping information, a user is able to navigate through a web-based user interface to determine root causes of network problems. Alternatively, an automated correlation process may be used to prioritize alerts of network problems, so that the root cause can be more easily ascertained.

20 Claims, 18 Drawing Sheets

ROOT-CAUSE APPROACH TO PROBLEM DIAGNOSIS IN DATA NETWORKS

TECHNICAL FIELD

The invention relates generally to monitoring and managing complex data network environments, and is particularly suitable for analyzing and diagnosing problems in an E-business system.

BACKGROUND ART

Component integration and other design issues have received a significant amount of attention in network settings, especially those used for electronic business (E-business). In the global communications network referred to as the Internet, portal sites have been created for enabling business-to-business transactions, business-to-consumer transactions, and consumer-to-consumer transactions. Much of the effort has been in the area of integration, so that a single system includes the backend databases used in the ordering procedure, the order fulfillment capability, and the payment processing capability. Another area that has received considerable attention is load balancing to ensure that one component does not act as a "bottleneck" for activity.

FIG. 1 illustrates one possible embodiment of an E-business system. To ensure redundancy, the system uses multiple Internet Service Providers (ISPs) 10, 12, and 14 to connect to the Internet. An access router 16 manages the connectivity to the ISPs. At least one load balancer 18 is responsible for receiving user requests via the ISPs and directing the requests to one of the available web servers 20, 22 and 24 used by the system. The web servers forward the incoming requests to the appropriate E-business applications. The E-business applications execute on middleware platforms commonly referred to as application servers 26 and 28. A firewall 30 is used to provide security.

The application servers 26 and 28 enable a number of features from which different applications can benefit. These features include optimization of connections to database servers 32, 34 and 36, caching of results from database queries, and management of user sessions. Data that is indicative of user information, a catalog of goods, pricing information, and other relevant information for the E-business system is stored in the database servers and is available for access by the application components. To process payments for goods or services by users, the system maintains connections to at least one remote payment system 38. Links to shipping agencies 40 are also provided, so as to enable the E-business system to forward the goods for shipping as soon as an order is satisfied.

Also shown in FIG. 1 are a Domain Name Service (DNS) server 42 and a Wireless Application Protocol (WAP) server 44, and Lightweight Directory Access Protocol (LDAP) server 45. As is known in the art, the DNS server is accessed to provide users with the Internet Protocol (IP) address. The WAP server may be used for frontending applications accessed via wireless devices such as mobile phones and Personal Digital Assistants (PDAs), while the LDAP server is used for storing and retrieving information in a directory format.

As compared to the emphasis on design issues of the E-business system, monitoring and managing issues for such systems have received significantly less attention. Many systems are managed using ad-hoc methods and conventional server and network monitoring systems, which are not specifically designed for an E-business environment. As a result, the monitoring capabilities are limited.

Since the business applications of a system rely on application servers for their operation, the application servers 26 and 28 are in a strategic position to be able to collect a variety of statistics regarding the health of the E-business system. The application servers can collect and report statistics relating to the system's health. Some of the known application servers also maintain user profiles, so that dynamic content (e.g., advertisements) generated by the system can be tailored to the user's preferences, as determined by past activity. However, to effectively manage the system, monitoring merely at the application servers is not sufficient. All the other components of the system need to be monitored and an integrated view of the system should be available, so that problems encountered while running the system (e.g., a slowdown of a database server or a sudden malfunction of one of the application server processes) can be detected at the outset of the problem. This allows corrective action to be initiated and the system to be brought back to normal operation.

FIG. 2 illustrates monitoring components as used with the E-business system of FIG. 1. The core components for monitoring include a manager 46, internal agents 48, 50 and 52, and one or more external agents 54. The manager of the monitoring system is a monitoring server that receives information from the agents. The manager can provide long-term storage for measurement results collected from the agents. Users can access the measurement results via a workstation 56. For example, the workstation may be used to execute a web-based graphical user interface.

As is known in the art, the agents 48, 50, 52 and 54 are typically software components deployed at various points in the E-business system. In FIG. 2, the internal agents are contained within each of the web servers 20, 22 and 24, the application servers 26 and 28, and the LDAP server 45. By running pseudo-periodic tests on the system, the agents collect information about various aspects of the system. The test results are referred to as "measurements." The measurements may provide information, such as the availability of a web server, the response time experienced by requests to the web server, the utilization of a specific disk partition on the server, and the utilization of the central processing unit of a host. Alternatively, tests can be executed from locations external to the servers and network components. Agents that make such tests are referred to as external agents. The external agent 54 is shown as executing on the same system as the manager 46. As previously stated, the manager is a special monitoring server that is installed in the system for the purpose of monitoring the system. The external agent 54 on the server can invoke a number of tests. One such test can emulate a user accessing a particular website. Such a test can provide measurements of the availability of the website and the performance (e.g., in terms of response time) experienced by users of the website. Since this test does not rely upon any special instrumentation contained within the element being measured, the test is referred to as a "black-box test."

Often, it is more efficient to build instrumentation into the E-business elements and services. For example, database servers 32, 34 and 36 often support Simple Network Management Protocol (SNMP) interfaces, which allow information to be obtained about the availability and usage of the database server. An external agent, such as agent 54, may execute a test that issues a series of SNMP queries to a particular database server to obtain information about the server's health. Since such a test relies on instrumentation built into the database server, tests of this type are referred to as "white-box tests."

External agents 54 may not have sufficient capability to completely gauge the health of an E-business system and to diagnose problems when they occur. For example, it may not be possible to measure the central processing unit utilization levels of a web server from an external location. To accommodate such situations, the monitoring system can use the internal agents 48, 50 and 52.

In the presently available manager-agent architectures for network monitoring, each measurement is associated with a state. The term "state" is defined herein as being synonymous with "health." The state of a measurement is computed by comparing the results of the measurement with pre-specified thresholds. When a measurement exceeds its threshold, the state of the measurement is changed to indicate that a problem has occurred and an alarm is generated to the user. The alarm may be displayed on a separate window of the user interface run at the workstation 56. Alternatively, an e-mail or pager message can be automatically generated to alert the user of the problem.

To facilitate problem diagnosis, some monitoring systems use the notion of a "service model." The service model is a tree-structured representation of the various components of a service that is provided by the system, as well as all of the interdependencies among the components. Within a representation of the service model, each host, process and server is indicated as a node. The different nodes are interconnected based on the node interdependencies. For example, a node representing a web server process may be connected to a web service node, since the state of the web server process node affects the web service node. According to this model, the state of the web server process node is determined on the basis of measurements associated with the node. In turn, the state of the web service node is determined on the basis of the state of the web server process node. A user must manually walk through the service model to determine the source of a problem.

There are a number of concerns with the known approaches for monitoring and managing a data network, such as an E-business system. One concern is that problems are typically reported individually. That is, alarms are generated based on individual measurements. Since there are numerous dependencies among processes, network elements and applications, a single problem in an E-business environment can result in several related alarms being generated. For example, a slowdown in a database server 32, 34 and 36 of a website can result in more connections accumulating at the web application servers 26 and 28. In turn, the web application servers can cause the web servers 20, 22 and 24 to slowdown. Ultimately, the slowdown of the database server can result in a denial of accesses to the website. As is evident from this example, when a problem occurs, the user of the monitoring system can be presented with a large number of alarms. This requires the user to wade through and correlate manually in order to identify the cause of the problem or problems. This may be time intensive. Moreover, a detailed understanding of the topology of the system is required in order to determine the location of the root cause of the problem.

The service model approach attempts to assist the manual diagnosis. By walking the service model graph in a top-down fashion, the user can determine the bottom-most problem node. The main drawback of the service model approach is that it uses a hierarchical approach to diagnosis. Therefore, the peer relationships that exist in many E-business environments (e.g., two websites may be hosted on the same web server, so that the two websites are peers to one another) must be cast in hierarchical relationship. Human operators may struggle to map the two-dimensional topology model to the uni-dimensional service model, and therefore find it difficult to use service models to comprehend the causes of problems.

What is needed is a method that simplifies and/or automates the process of identifying a root cause of an operational problem in a network environment, such as an E-business system.

SUMMARY OF THE INVENTION

A network monitoring method includes storing topology information and mapping information that allow root causes of network problems to be efficiently ascertained. In one embodiment of the invention, network health is monitored using a web-based user interface that enables navigation of health conditions of network components and protocol layers. In another embodiment, the topology information and mapping information are employed to enable automated correlation between detected "bad" states and root causes, as well as automated prioritization of generated alerts for notifying personnel of detected "bad" states.

As one key to the correlation methodology, a physical topology representation is generated. The physical topology is a mapping of the interconnections among network components. The interconnections represent physical connections and logical dependencies among the components. Preferably, at least some of the interconnections are associated with a direction that signifies a cause-and-effect relationship between the connected components.

In the preferred embodiment, a logical topology representation is also generated, since the physical topology does not consider websites. The logical topology maps each website to the components which support the website. The logical topology maps a website to at least one web server, with the website inheriting the physical topology interconnections of the web server. Thus, the logical topology of a particular website is a subset of the physical topology. As is known in the art, a website offers one or more services to users who access the website. The various services that are available via a website are referred to herein as "transactions."

A hierarchy of protocol layers is identified, with the hierarchy being based on interdependencies among the protocol layers with regard to implementing functions. That is, the protocol layers are related to component functionalities and are ranked according to functionality-to-functionality dependencies for implementation. As one example, a web transaction layer is dependent upon support from a website layer, which is dependent upon support from a web server layer.

Each network component is mapped to the protocol layers on the basis of the functionalities of the network component. Moreover, measurements from various available network tests are mapped to the protocol layers on the basis of relationships between the measurements and the health of the protocol layers. "Health" will be used herein as being synonymous with the operational state of the component, protocol layer, website, transaction, or measurement which it modifies.

The health of the data network can be monitored by utilizing the collection of topology information and mapping information. In one embodiment, the monitoring is performed using a web-based user interface that displays health conditions of the components and the protocol layers of the components, using the mapping of the measurements to the protocol layers as a basis for displaying the health conditions. The web-based user interface enables navigation through the information that is indicative of the present operating states of the components, the present operating states of the websites, the present operating states of the protocol layers as mapped to the components, and the present states of the measurements. A user of the methodology is able to "drill down" to the root cause of a problem by navigating through the "bad" states of the components, websites, protocol layers, transactions, and measurements.

In another embodiment, automatic correlation generates alerts regarding the "bad" states. The automated correlation process includes prioritizing the alerts on a basis of identifying a root cause of a problem that resulted in one or more measurements being determined to be undesirable. A user of the process is presented with a display that indicates the priority of the alerts.

DETAILED DESCRIPTION

The invention automatically analyzes the results of measurements of components and operations of a data network, and then guides the user to the root cause of a problem or problems in the data network. There are two mechanisms by which the monitoring system guides a user to the root cause of a problem. In accordance with a first mechanism, a web-based user interface allows the user to view the states of the individual websites of an E-business environment or similar environment. Detailed "drill-downs" allow the user to zoom into the measurement or measurements that are faulty.

In accordance with the second mechanism, the monitoring system automatically correlates across the states of each of the measurements and determines the high priority alarms that must be highlighted to the user via a display, such as an alarm window presented to the user on a workstation monitor. Through this second mechanism, the user is visually presented with the key problems in the environment. Furthermore, the user preferably has a list of other alarms that may have been the result of the root cause. The key benefit of this approach is that the data analysis and correlation are done automatically, so that the root cause of the problems can be reported without the need of any manual intervention. This capability can offer significant cost and time savings for operators of an E-business system. First, problem diagnosis occurs as soon as a problem is identified in the system. This allows operators to correct problems soon after they occur, thereby minimizing system downtime and increasing customer satisfaction. Second, since problems are reported in a straightforward manner, lower skilled personnel can be used to continuously provide support. When a problem occurs, the first level diagnosis can be performed by the support person on duty, and the problem can be forwarded immediately to domain experts (e.g., database administrators and system administrators) for correction.

For both of the mechanisms, a key to the data analysis and correlation methodology is the decomposition of the E-business environment into a set of components that are interconnected. The components and their interconnections are based upon both a physical topology representation and a logical topology representation. A "component" will be defined herein as one of the units of the network. Any server, such as a web server, a web application server, a database server instance, a proxy server, a DNS server or an LDAP server is a component. Network routers and switches are also considered as components.

Figure 3:
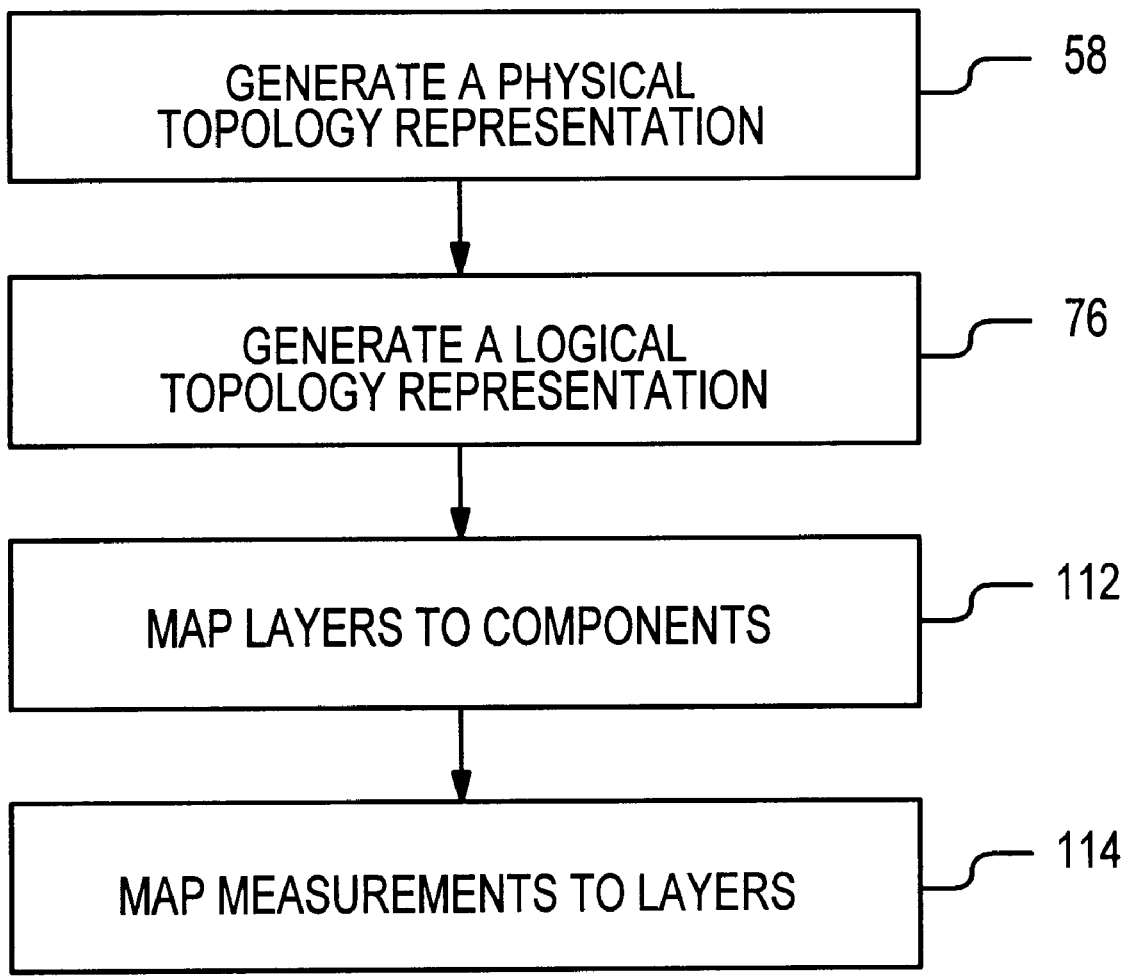
FIG. 3 is a process flow of steps for enabling network monitoring and management in accordance with the present invention.
Figure 4:
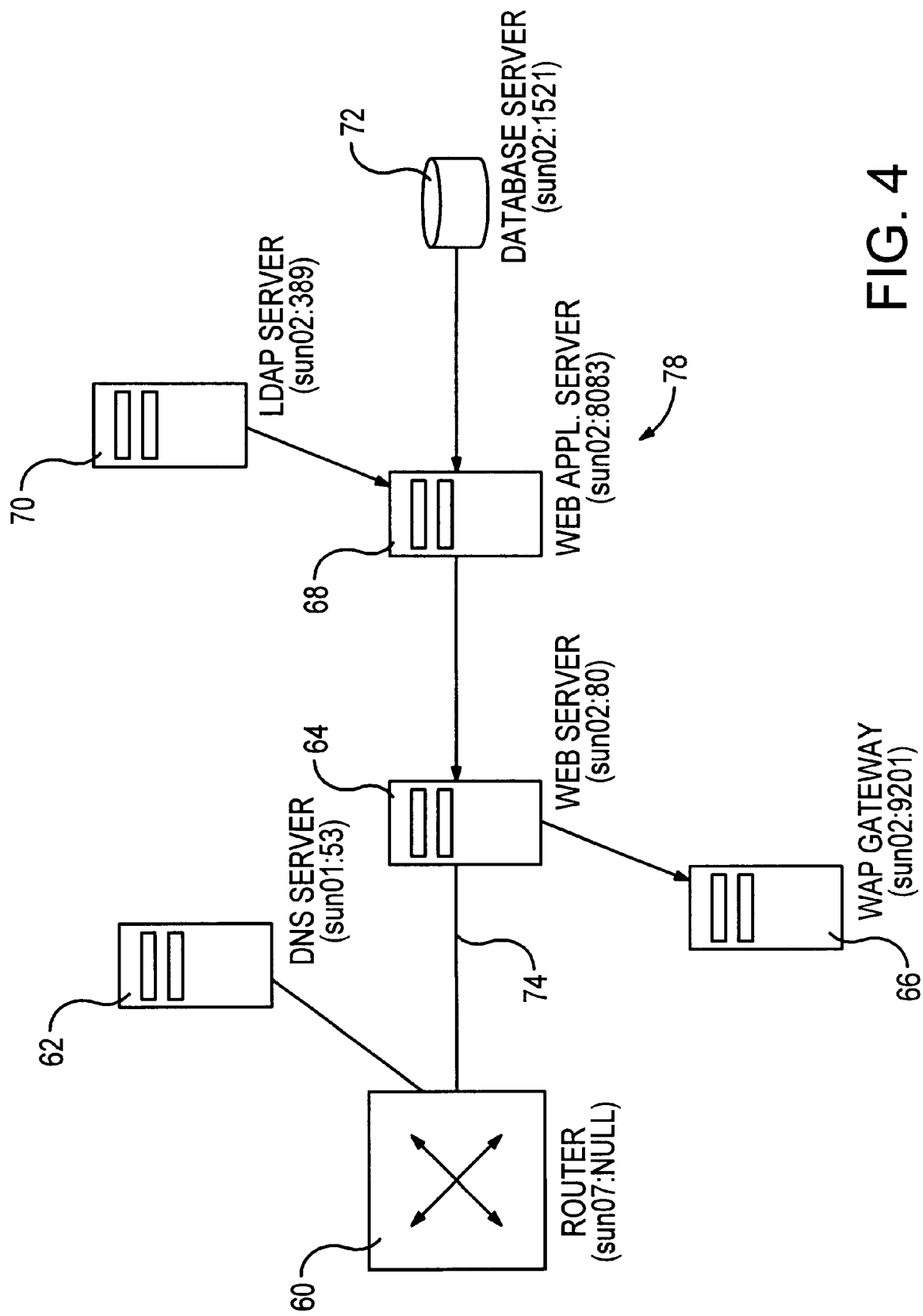
FIG. 4 is a representation of a physical topology of an E-business system for application of the present invention.

Referring now to FIG. 3, at step 58, the physical topology representation is generated. The physical topology is a listing of all of the components of an E-business environment and the interconnections among the components. FIG. 4 is a physical topology of an example of an E-business environment. In this particular environment, the network includes a router 60, a DNS server 62, a web server 64, a WAP gateway 66, a web application server 68, an LDAP server 70 and a database server 72. The physical topology can be configured by the user at the time of setting up the monitoring system. Alternatively, the physical topology can be automatically generated by the monitoring system.

The physical topology that is generated at step 58 includes the interconnections which represent either physical connections or logical dependencies among components. A physical connection is shown by the link 74 between the web server 64 and the router 60. A logical dependency would be one in which one component is dependent on another component for execution of its functions. For example, the web server 64 is configured to use a specific web application server 68. Many of the links between the components include a direction arrow. The direction arrows signify cause-and-effect relationships (if any) between components that are interconnected. For example, the web server component 64 is affected by the web application server component 68, since the web server relies upon the web application server for proper execution. In turn, the web application server component 68 is affected by the database server instance 72 for achieving its proper functioning.

At step 76 of FIG. 3, the representation of the logical topology is generated. Logically, an E-business environment is comprised of one or more websites. A website is a logical entity that is hosted on one or more web servers, such as the web server 64 of FIG. 4. The website offers one or more services to its users. The various services that are available to users via the website are referred to herein as "transactions."

The physical topology that is generated at step 58 does not consider websites. On the other hand, the logical topology maps a website to one or more web server components of the physical topology. When a particular website is mapped to a specific web server, the website inherits the logical interdependencies of the web server component in the physical topology.

Figure 5:
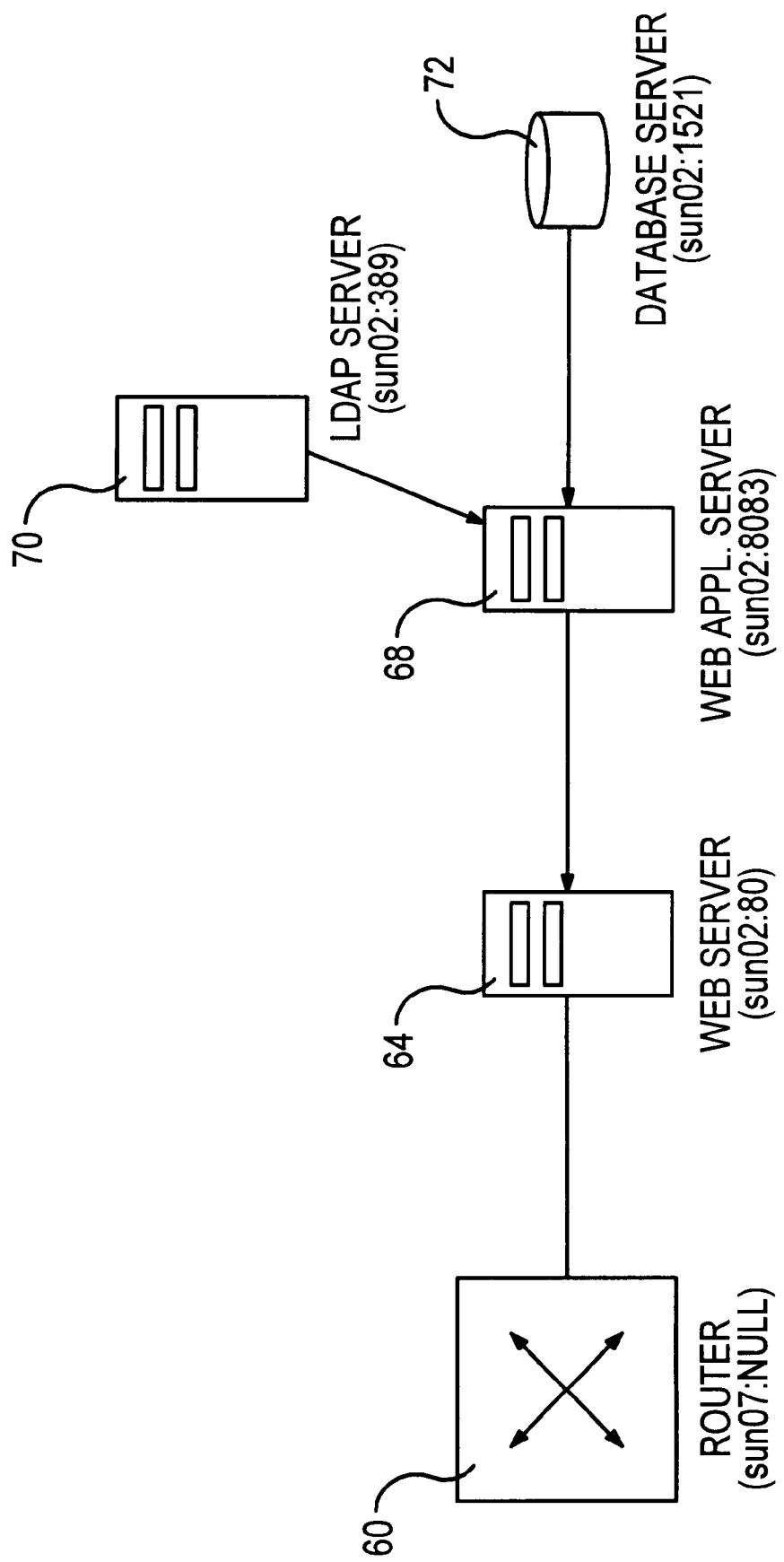
FIG. 5 is a representation of a logical topology for a website supported by the physical topology of FIG. 4.

Multiple websites may map to the same web server component. However, all of the interconnections from the web server in the physical topology are relevant to all of the websites that it supports. For example, in the physical topology 78 of FIG. 4, a pair of websites (e.g., www.abc.com and buy.abc.com) may map to the same web server 64. While the website buy.abc.com may be associated with the router 60, the web server 64, the web application server 68, the LDAP server 70 and the database server 72 of the physical topology, the website www.abc.com may only be associated with the WAP gateway 66 and the web server 64. In the preferred embodiment, rather than specifying only the individual components related to the website, the monitoring system operates on the principle of explicit exclusion. FIG. 5 is a representation of the logical topology for the website buy.abc.com. The logical topology representation explicitly identifies those components in the physical topology that do not appear in the logical topology of the website. Thus, for each website that is represented in the logical topology, there are indications of (1) the transactions supported by the website, (2) the web server or servers to which the website maps, and (3) the components of the physical topology that do not form a part of the website's component list.

In the preferred embodiment of the monitoring system, the physical and logical topologies are specified manually by the user. The topologies are stored internally in a configuration file which may be specified in the INI format commonly used for configuration in Windows-based systems. An example of a stored configuration file for the physical topology 78 of FIG. 4 is as follows:

[PHYSICAL_TOPOLOGY]
Network_node:192.168.10.1:NULL=Web_server:sun02.istl.com:80:N,
Dns_server:sun01.istl.com:53:N
Web_server:sun02.istl.com:80=Nas_server:sun02.istl.com:8083:L
Nas_server:sun02.istl.com:8083=Ldap_server:sun02.istl.com:389:L,
Oracle_server:sun02.istl.com:1521:eGurkha:L Wap_gateway:sun02.istl.com:9201=Web_server:sun02.istl.com:80:L
Oracle_server:sun02.istl.com:1521:eGurkha=null
Dns_server:sun01.istl.com:53=null
Ldap_server:sun02.istl.com:389=null An example of a configuration file of a logical topology is as follows:

[LOGICAL_TOPOLOGY]
Web_site:info.istl.com=Nas_server:sun02.istl.com:8083:D,
Oracle_server:sun02.istl.com:1521:eGurkha:D,
Wap_gateway:sun02.istl.com:9201:D, Ldap_server:sun02.istl.com:389:D,
Web_site:www.istl.com=Nas_server:sun02.istl.com:8083:D,
Oracle_server:sun02.istl.com:1521:eGurkha:D,
Wap_gateway:sun02.istl.com:9201:D, Ldap_server:sun02.istl.com:389:D
Web_site:buy.abc.com=Wap_gateway:sun02.istl.com:9201:D
Web_site:www.abc.com=Nas_server:sun02.istl.com:8083:D,
Oracle_server:sun02.istl.com:1521:eGurkha:D,
Ldap_server:sun02.istl.com:389:D
[WEB_SITE_MAPPING]
Web_site:www.abc.com=Web_server:sun02.istl.com:80
Web_site:www.istl.com=Web_server:sun02.istl.com:80
Web_site:info.istl.com=Web_server:sun02.istl.com:80
Web_site:buy.abc.com=Web_server:sun02.istl.com:80
[TRANSACTIONS]
buy.abc.com: Registration=*jsp/RegistrationForm.jsp
buy.abc.com:Login=*jsp/LoginForm.jsp
buy.abc.com:Browse Catalog=*BookDetailServlet*
buy.abc.com:SearchCatalog=*SearchServlet*
buy.abc.com.AddToCart=*CartServlet?addBook*
buy.abc.com:DropFromCart=*CartServlet?*del=*
info.istl.com:StaticPages=*.html|*.htm
info.istl.com:CgiPages=*.cgi
www.abc.com.StaticPages=*.html|*.htm
www.abc.com:Applications=*/cgi-bin/gx.cgi/*
www.abc.com:Login=*/cgi-bin/Login
www.abc.com:ViewBalances=*/cgi-bin/ViewBalances
www.abc.com:Transfer=*/cgi-bin/Transfer
www.abc.com.WmlPages=*WmlServlet*
www. istl.com:StaticPages=*.html|*.htm|*.gif|*.jpg
www.istl.com:JspPages=*.jsp The WEB_SITE_MAPPING section provides a mapping of the different websites to the supporting web servers. As previously noted, a single website can map to multiple web servers. Alternatively or additionally, a single web server can host multiple websites. The PHYSICAL_TOPOLOGY section of the configuration file indicates the interdependencies among the different servers in the network infrastructure. The directionality associated with the dependencies is also indicated in the physical topology by utilizing the letter "L" to imply left and the letter "N" to apply no direction for the dependency. The LOGICAL_TOPOLOGY section explicitly lists servers that are not a part of the logical dependency list for a particular website. Finally, the TRANSACTIONS section defines the transactions for each of the websites and how a web adapter must account for these transactions.

The logical topology maps a website to the components on which it depends. The state (i.e., the health) of a website is determined on the basis of the states of its dependent components. A "bad" state for any component results in the website itself being regarded as having a problem. Other state computation rules may also be implemented, such as designating the state of the website on the basis of the states of a majority of components in its component list.

Figure 6:
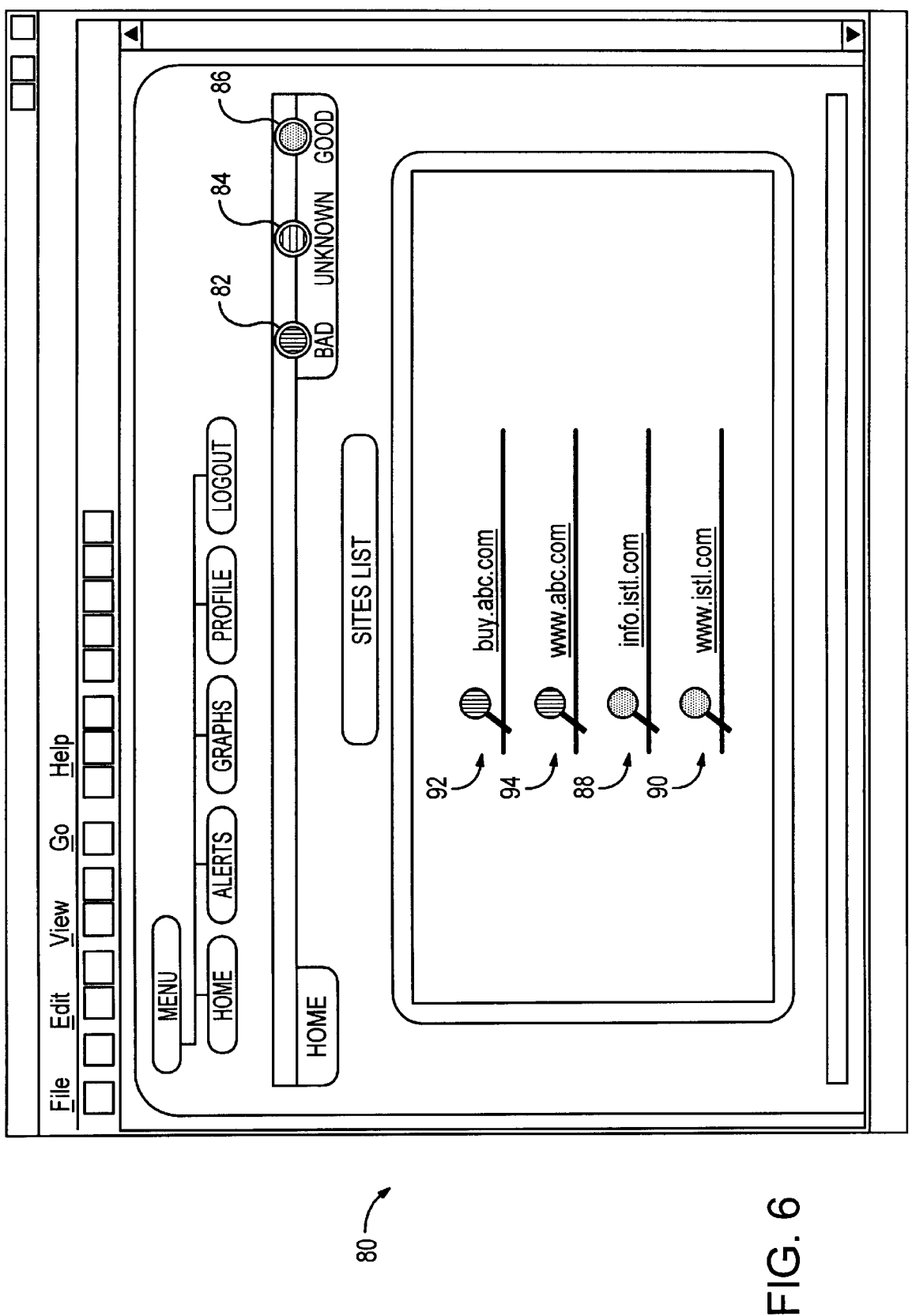
FIG. 6 is an example of a user interface that includes a window indicating the states of the websites supported by the physical topology of FIG. 4.

The states of the websites can be represented to a user in a graphical user interface 80, such as the one shown in FIG. 6. In the window of FIG. 6, there are three potential shadings 82, 84 and 86 to indicate whether a state is "bad," "unknown" or "good." Alternatively, the designations may be color related. The window shows that there are four websites being monitored. The websites info.istl.com 88 and www.istl.com 90 are indicated as being healthy. On the other hand, the websites buy.abc.com 92 and www.abc.com 94 are indicated as experiencing problems.

Figure 7:
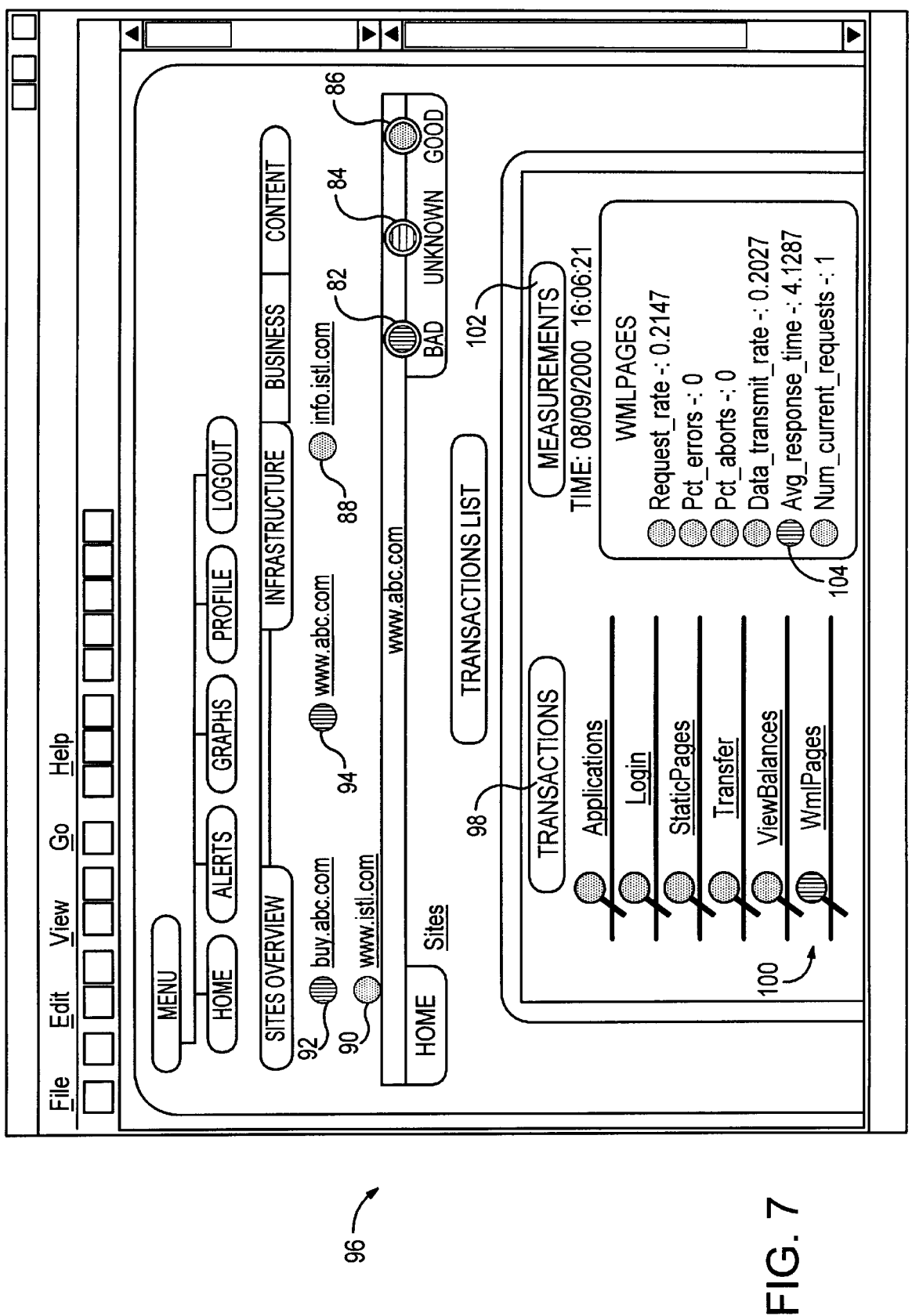
FIG. 7 is an example of the user interface with a window indicating the states of the transactions and measurements that are relevant to the www.abc.com website indicated in FIG. 6.

In accordance with the first embodiment of the invention, a user is able to "drill down" to another level of the E-business system in order to identify a root cause of a problem. For example, if the website www.abc.com 94 of FIG. 6 is selected from the window 80, the graphical user interface may open the window 96 of FIG. 7. In this window, it is indicated that of the six possible transactions 98, only the WmlPages transaction 100 is problematic. The measurements 102 relevant to this transaction are also indicated as having states that are "good" and "bad" (in this case, none of the measurements is indicated as having an "unknown" state). The only "bad" measurement is the average response time measurement 104. This measurement is designated as having an unhealthy state, since the measured time of 4.1287 seconds is above a preselected threshold time.

By considering the states of the individual components associated with a website and the dependencies among the components, the user can determine the component that is likely to be the root cause of a problem. In the window 106 of FIG. 8, the logical topology 108 indicates that the WAP gateway 66 and the web server 64 have both moved into a problem state. Since the WAP gateway uses the web server, the health of the gateway may be impacted by the operation of the web server, as indicated by the dependency arrow 110 linking the two components. A user of the monitoring system can easily interpret that the root cause of the problem is most likely to be the web server 64.

Returning to the process flow of FIG. 3, the monitoring system decomposes each component into a set of protocol layers at step 112. Moreover, the measurements are mapped to the layers at step 114. The layer to which a measurement maps is specified to the monitoring system in a configuration file. An example of a configuration file of the component-to-layer mapping and the measurement-to-layer mapping follows:

[COMPONENT_LAYER_TABLE]
; format of this section is: <ComponentName><Level>= <Level>=<LayerName>
Web_server:0=NETWORK
Web_server:1=TCP
Web_server:2=APP_PROCESSES
Web_server:3=WEB_SERVER
Web_server:4=WEB_SITE
Web_server:5=WEB_TRANSACTIONS
Web_server:-1=HOST
[MEASUREMENT_LAYER_TABLE]
; format of this section is: <TestName>:<Measurement>= <LayerName>

HttpTest:Availability=WEB_SERVER
HttpTest:Response_time=WEB_SERVER
HttpTest:Tcp_connection_availability=WEB_SERVER
HttpTest:Tcp_connect_time=WEB_SERVER
HttpTest:Server_response_time=WEB_SERVER
ProcessTest:Num_procs_running=APP_PROCESSES
ProcessTest:Cpu_util=APP_PROCESSES
ProcessTest:Memory_util=APP_PROCESSES
WebSiteTest:Connection_rate=WEB_SITE
WebSiteTest:Request_rate=WEB_SITE
WebSiteTest:Data_transmit_rate=WEB_SITE
WebSiteTest:Pct_errors=WEB_SITE
WebSiteTest:Pct_aborts=WEB_SITE
WebSiteTransactionTest:Request_rate=WEB_TRANSACTIONS
WebSiteTransactionTest:Pct_errors=WEB_TRANSACTIONS
WebSiteTransactionTest:Pct_aborts=WEB_TRANSACTIONS
WebSiteTransactionTest:Data_transmit_rate=WEB_TRANSACTIONS As a consequence, each layer maps to a set of functionalities that an E-business operator is able to understand. For example, the layers corresponding to a particular web server component of a specific website could include (1) a "network layer" which deals with packet transmissions over the network, (2) a host layer which deals with the central processing unit, memory and disk resources of the server on which the website is hosted, (3) the TCP layer which maps the TCP connections to and from the server, (4) the application process layer which determines the states of processes that are essential for the website to be operational, (5) the web server layer which indicates whether the web server application is working efficiently, (6) the website layer which determines whether the website is working as expected, and (7) the web transactions layer which includes all the key transactions executed via the website.

In steps 112 and 114 of FIG. 3, each layer is associated with a level. The associated level of a layer is based on the dependencies of that layer on other layers of the same component. The levels are hierarchical, so that a layer at level 1 depends on layers associated with levels lower than level 1. The monitoring system assumes that the foremost problematic layer is the root cause of a problem. However, a special case is the host layer, since a problem at the host layer can affect all of the other layers.

During operation of the monitoring system, the state of each layer is determined on the basis of the states of the individual measurements that map to this layer, while the state of a component is determined on the basis of the states of its layers. Various policies may be implemented in the practice of this step. The mapping of components to layers at step 112 of FIG. 3 is executed whenever the monitoring system is enhanced to monitor a new component of the data network. Similarly, the mapping of measurements to layers at step 114 is determined when a new test is being designed for the monitoring system.

Figure 9:
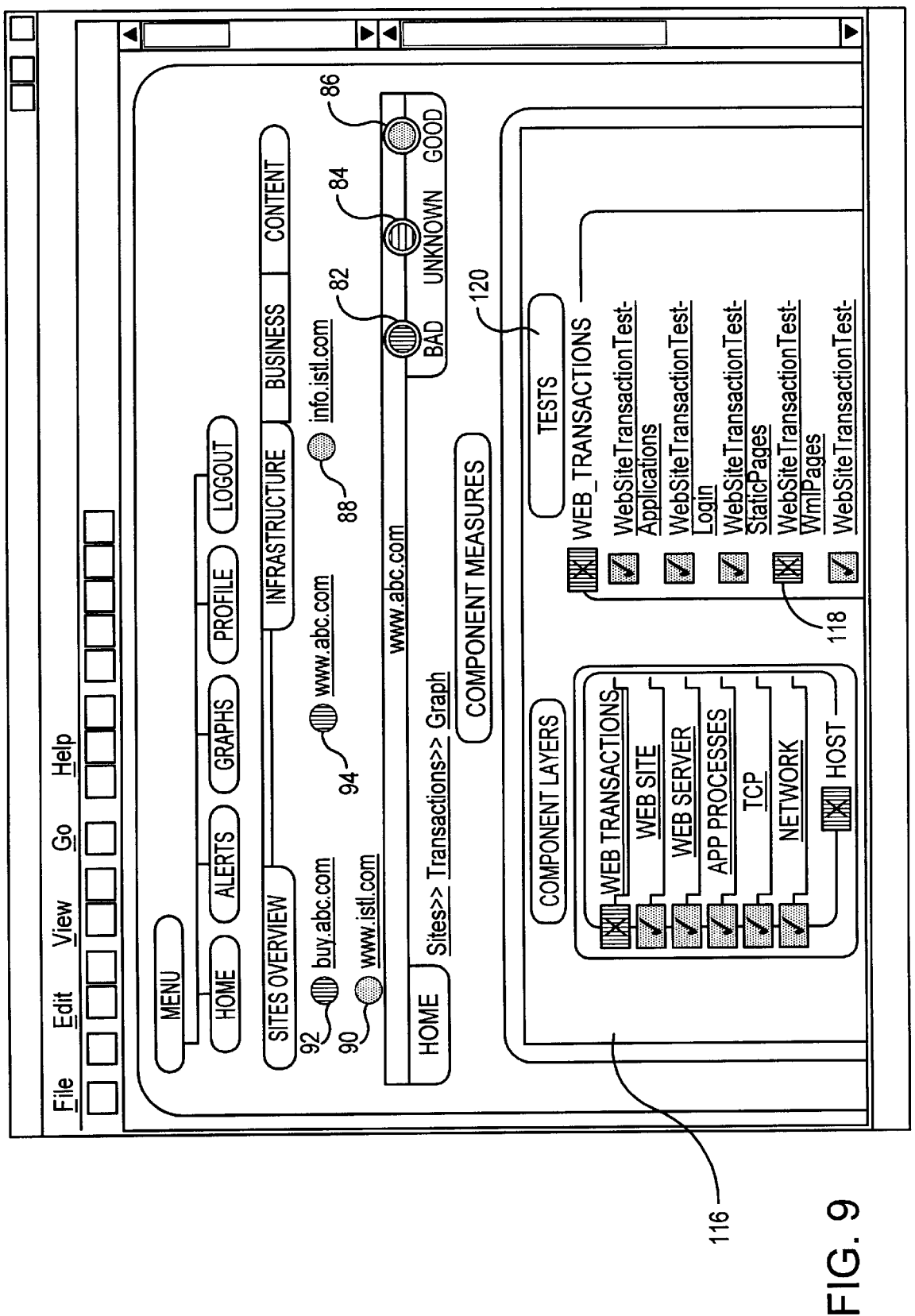
FIGS. 9 and 10 are an example of the user interface with a window that indicates the states of component layers and tests that are relevant to the www.abc.com website.
Figure 10:
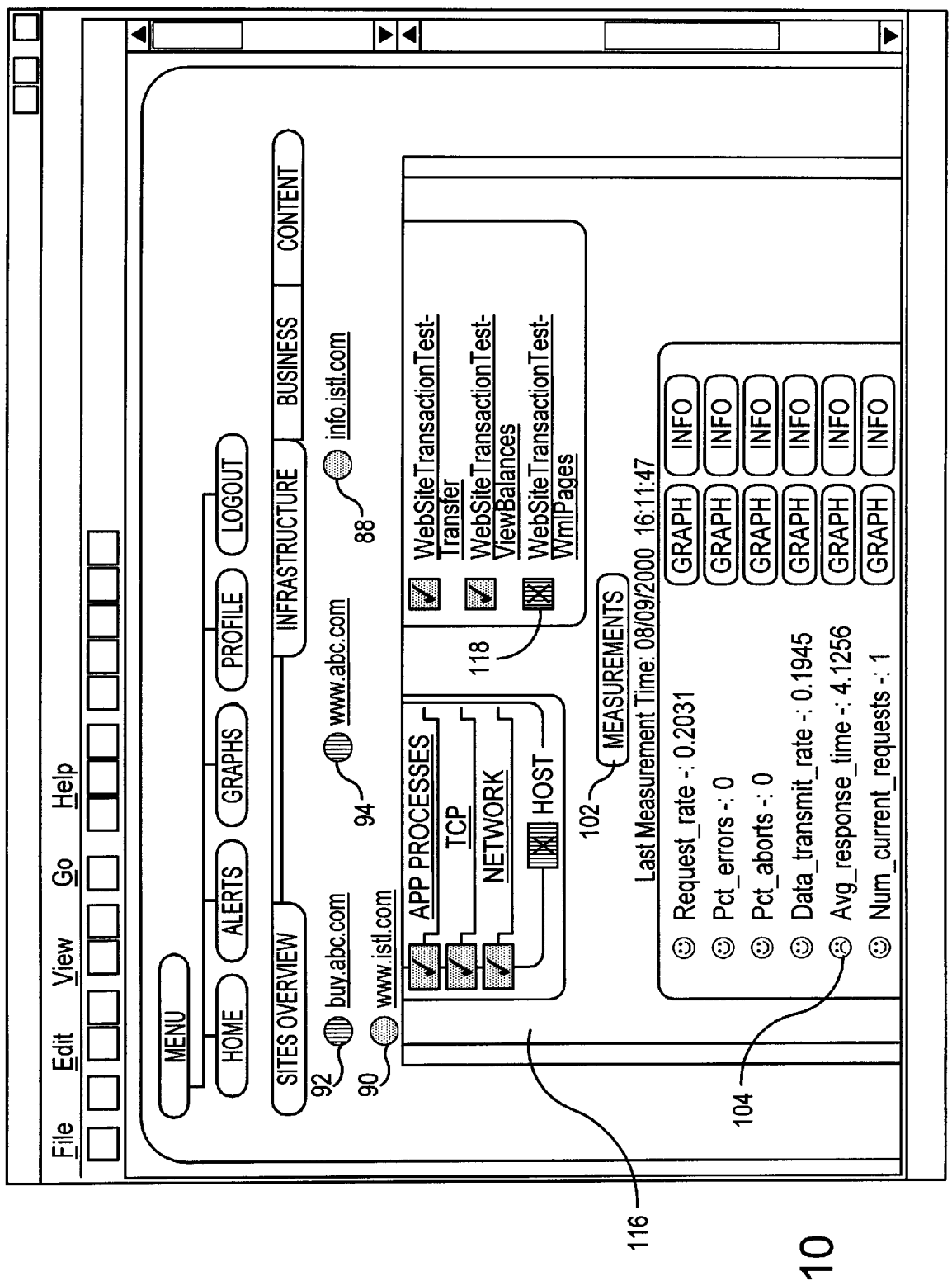

Referring now to FIGS. 9 and 10, a scrollable window 116 may be manipulated to allow a user to further "drill down" in order to better ascertain the health of a specific component, such as the web server 64 that was identified above. The information provided in FIGS. 9 and 10 is consistent with that of FIG. 7, but the measurements 102 are taken at a slightly later time. As in FIG. 7, the only measurement that is indicated as being problematic is the average response time measurement 104. From the portion of the window 116 shown in FIG. 10, it is apparent that a problem is at the WEB_TRANSACTIONS layer and that only the transactions dealing with the WML pages are failing (as indicated by the coded box 118).

Figure 11:
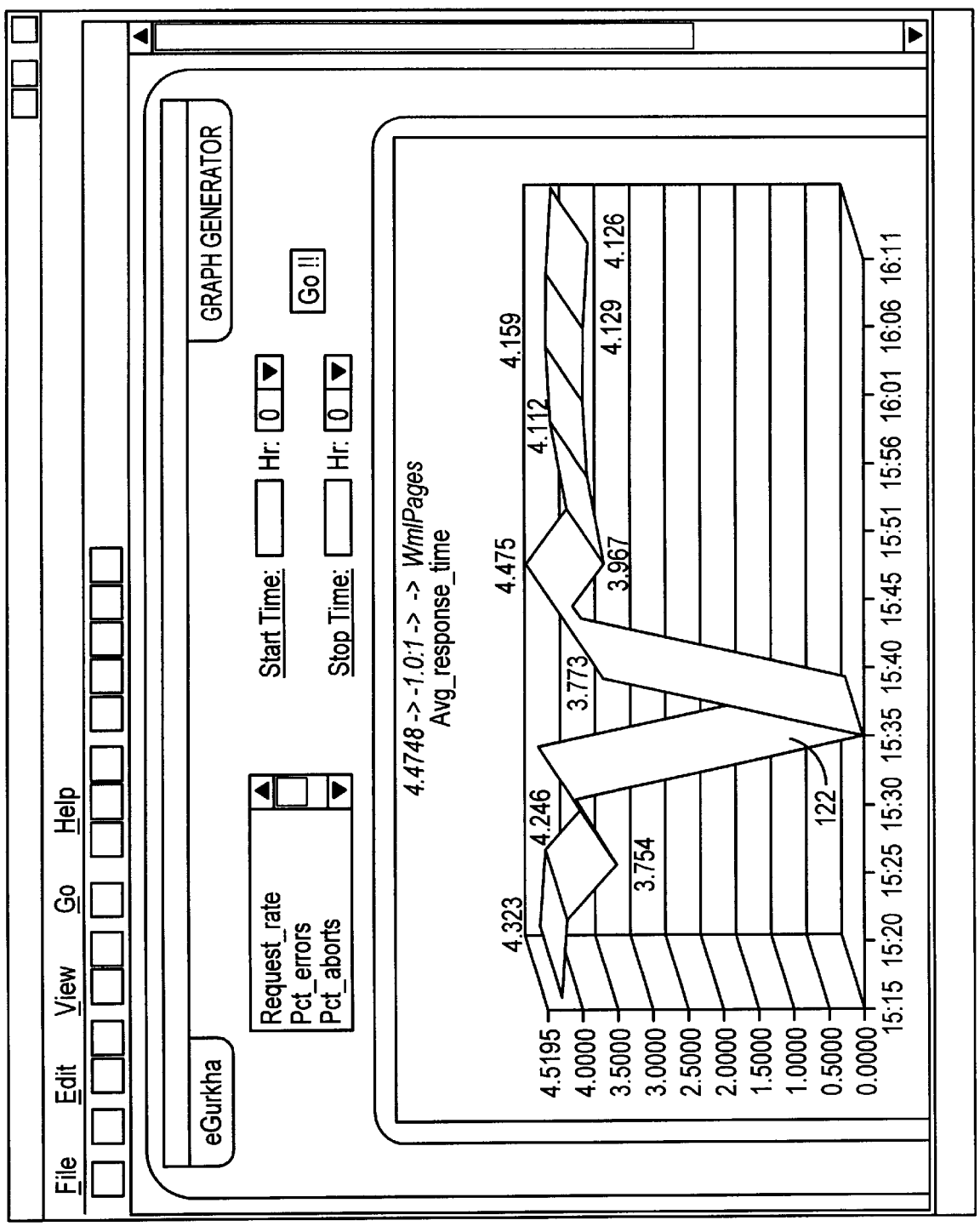
FIG. 11 illustrates a plot of response time over time, in accordance with the invention.
Figure 12:
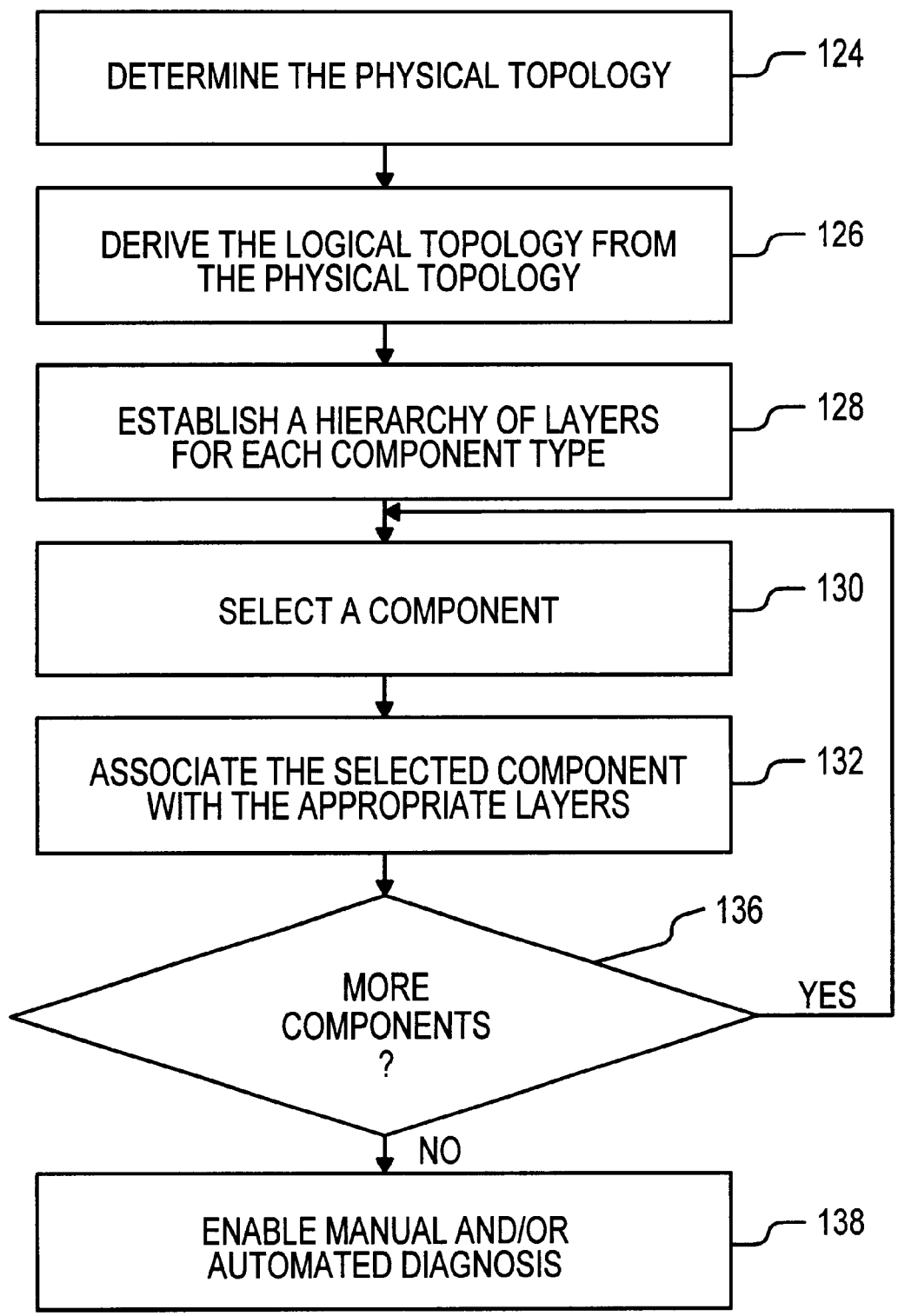
FIG. 12 is a process flow of steps for enabling diagnosis in accordance with the invention.

The state of a layer depends on the state of measurements that map to that layer. Mapping of measurements to layers may be employed by users of the monitoring system for further diagnosis of the data network. For example, in FIG. 9, from the WEB_TRANSACTIONS layer, the user is able to view the individual tests 120 that are executed for the designated layer. In the application of FIG. 9, there are five tests for the WEB_TRANSACTIONS layer, with only the coded box 118 showing a problem with the execution of a test. Once again, by drilling down to view an individual measurement, the user is able to determine that it is one transaction (i.e., WmlPages) that is experiencing a problem and that the problem is a result of an increase in response time. The user can use this information to check the specific application corresponding to the transaction and to perform further diagnosis. Another level of drill-down allows the measurement results to be plotted as a function of the time of day, thereby indicating to the user the time that the problem first occurred. An example of such a plot 122 is shown in FIG. 11.

FIGS. 12-18 are included to illustrate continuity of the steps for determining the root cause of one or more problems. In step 124, the physical topology of a data network, such as an E-business system, is determined. The physical topology is a listing of all of the components of the data network and the interconnections among the components. The interconnections can represent both physical connections and logical dependencies. In FIG. 4, the link 74 between the router 60 and the web server 64 is a physical connection, while the link between the web application server 68 and the web server 64 is a logical dependency. Links with arrowheads signify cause-and-effect relationships, so that the physical topology represented in FIG. 4 indicates that the web server 64 may be affected by the health of the web application server 68.

At step 126, the logical topology is derived from the physical topology. The logical topology maps websites to one or more web server components of the physical topology. Each logical topology is a subset of the physical topology from which it is derived. In the preferred embodiment, each logical topology is specific to a website and indicates the transactions supported by the website, the web servers to which the website maps, and the components of the physical topology that do not form a part of the website's component list.

As a result of the organization of information acquired from steps 124 and 126, a web-based user interface may be used to enable a user of the monitoring system to view the states of individual websites and to "drill down" in an effort to determine the root cause of a problem or problems. However, in the preferred embodiment, additional capability is achieved by following additional steps. At step 128, a hierarchy of protocol layers is established for each component type. That is, each of the layers is associated with a level, with the levels being indicative of the dependencies among the layers in the implementation of the component type. Thus, a layer at level 3 depends on the health of layers at the lower levels. One of the components of the data network is then selected at step 130. The selected component is associated with the various layers that are relevant to the selected component, as indicated at step 132. The association is based upon the dependency of the health of the component upon the health of the layers.

Decision step 136 is a determination of whether there is an additional component. If so, the process loops back to the steps 130 and 132 of selecting the additional component and mapping the appropriate layers to the selected component. When a negative response is eventually reached at decision step 136, the manual and/or the automated diagnostic process is enabled at step 138.

Regarding manual diagnosis, a monitoring system manager must support two tasks if this capability is to be enabled. The first task is a background task that is executed by the manager as and when it receives a new measurement report from an agent. The steps for implementing this first task will be described with reference to FIG. 13. The second task is executed by the manager when it handles each drill-down request from a user via a user interface for manual diagnosis. The steps with regard to the second task will be described with reference to FIG. 14.

Figure 13:
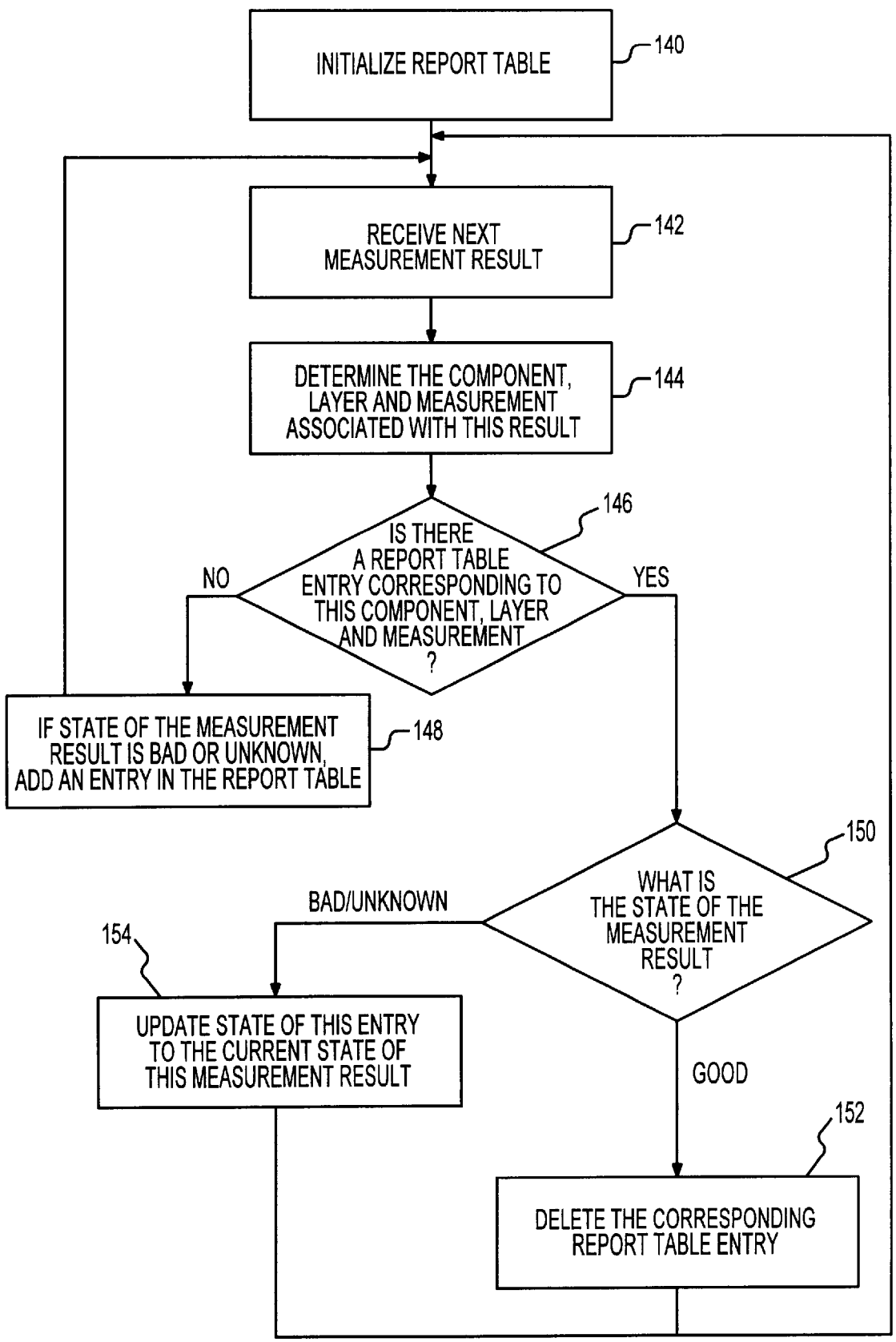
FIG. 13 is a process flow of steps for maintaining a report table in accordance with a manual diagnostic embodiment of the invention.
Figure 14:
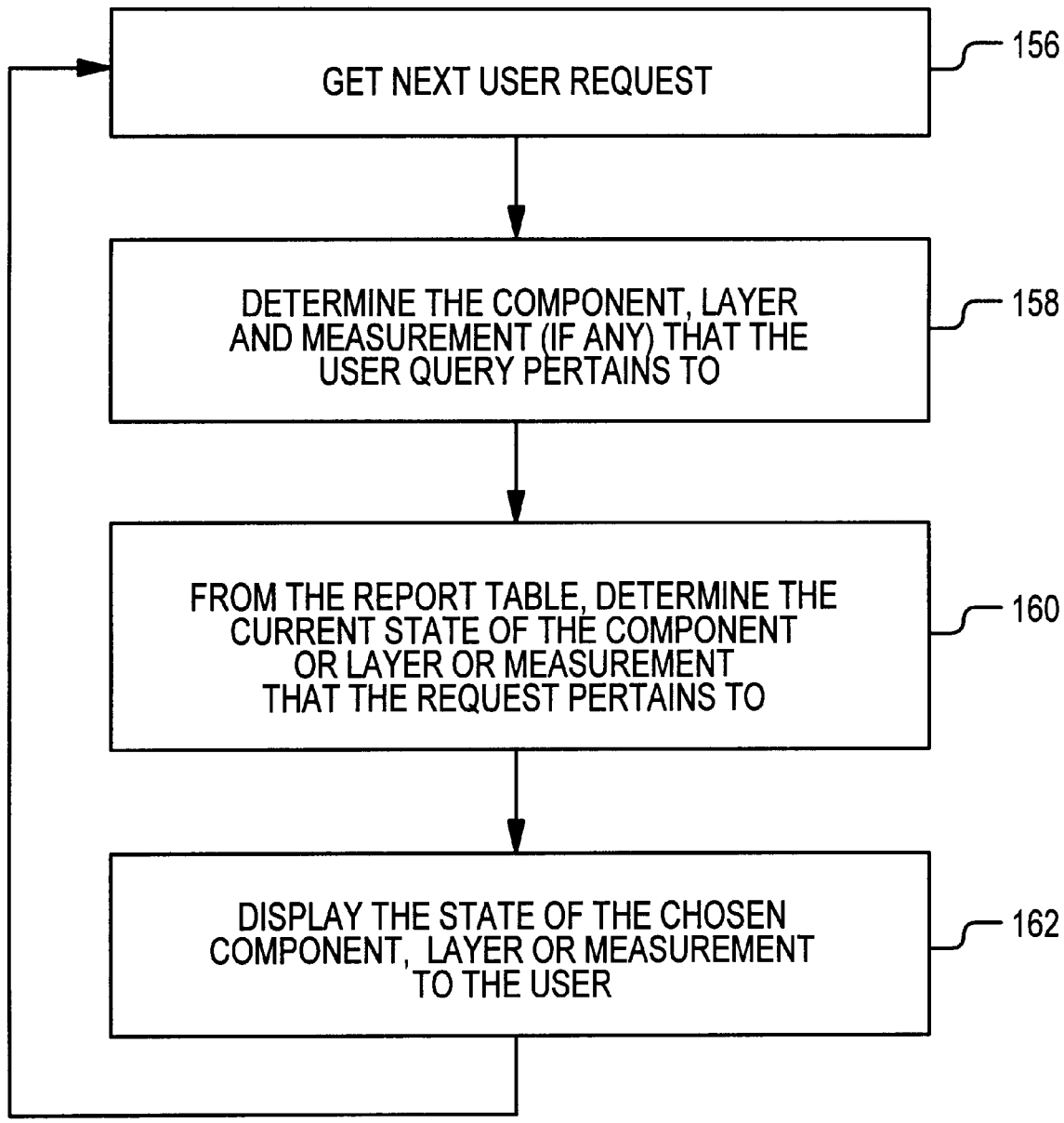
FIG. 14 is a process flow of steps for responding to a drill-down request received in the manual diagnostic embodiment.
Figure 15:
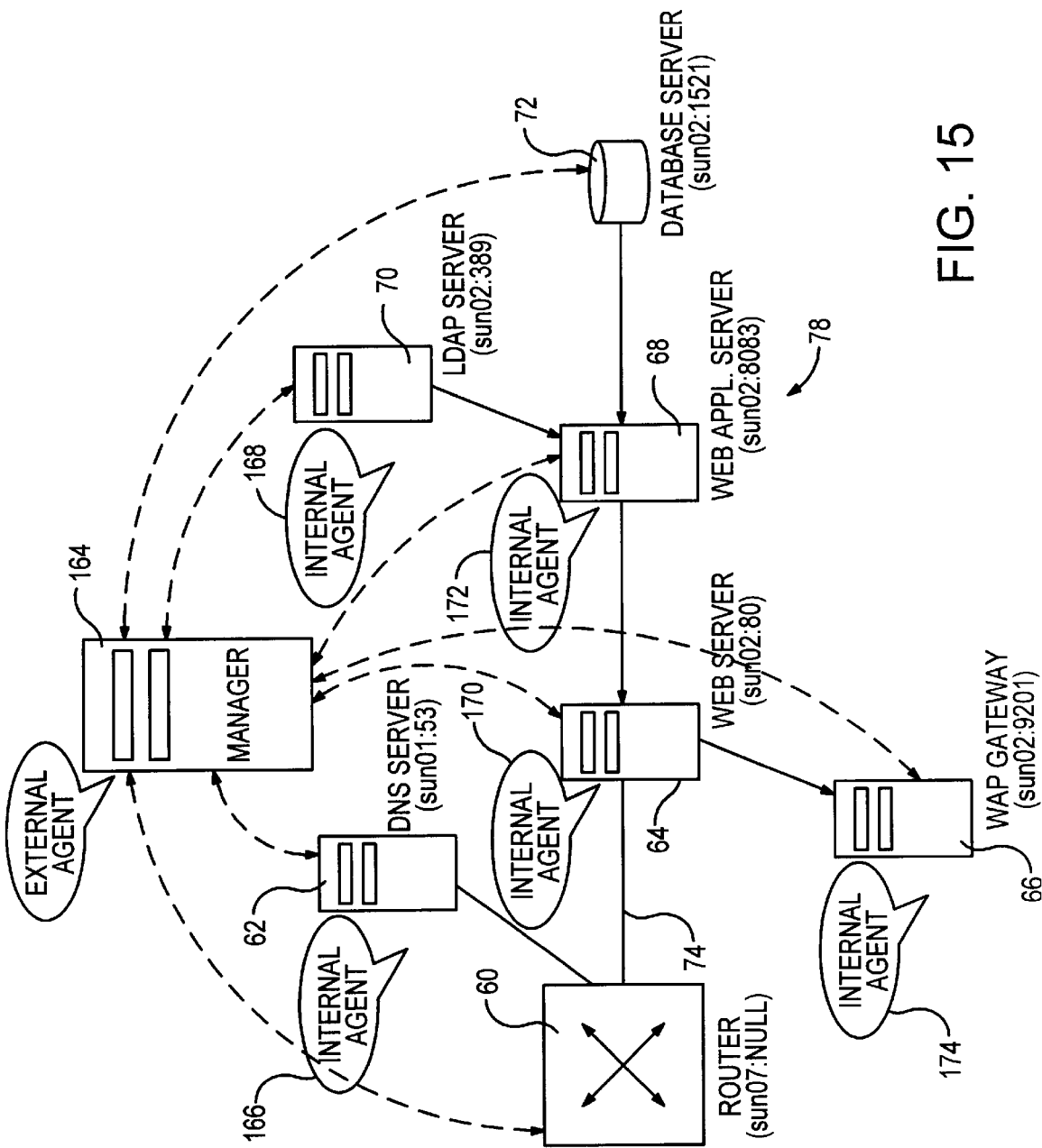
FIG. 15 is a representation of the physical topology of FIG. 4, but with a monitoring system for implementing the process of FIGS. 12–14 and 16–18.

In FIG. 13, a report table is initialized at step 140. As an updated or new measurement result is received at step 142, the manager attempts to construct and maintain the report table. The report table includes a list of components and the corresponding layers that are in a "bad" or "unknown" state. The component is identified uniquely by a combination of the host on which the component is executed, the port number, and any additional description (e.g., the instance identification of the component).

Figure 1:
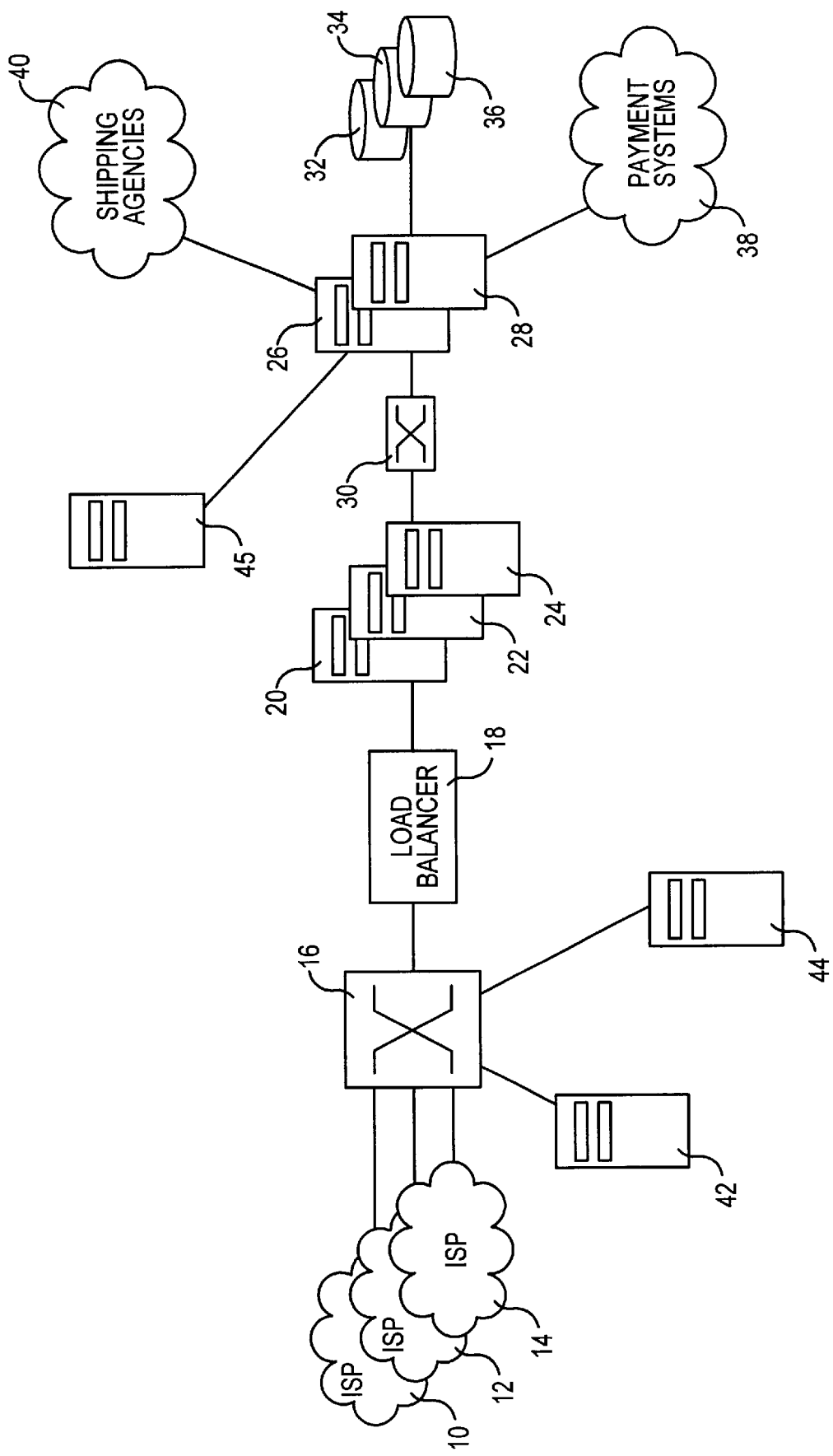
FIG. 1 is a schematic view of the components of a conventional E-business system.
Figure 2:
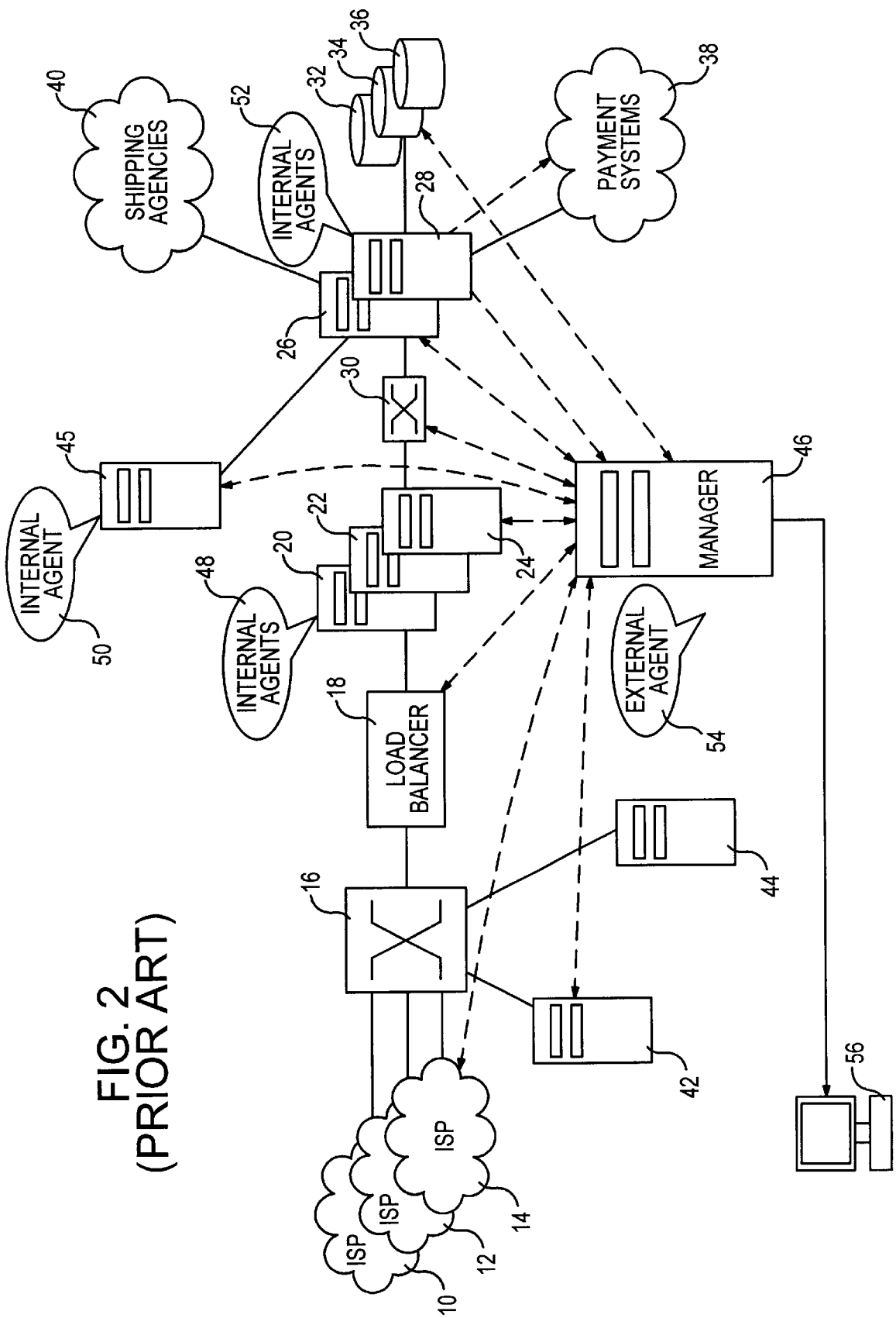
FIG. 2 is a schematic view of the system of FIG. 1 with a monitoring system for monitoring the operations of the components of the system.

A measurement result that is received at step 142 may be generated from an internal or external agent of the type described with reference to FIGS. 1 and 2. At step 144, the result that was received is associated with the appropriate component, layer and measurement. In decision step 146, the manager ascertains whether there is a report table entry that corresponds to the component, layer and measurement. When it is determined that a report table entry does not exist, one is created at step 148, but only if the state of the measurement result is "bad" or "unknown." The table-maintenance procedure then moves back to step 142.

When an affirmative response is generated at decision step 146, the state of the measurement result is ascertained at step 150. For a "good" state measurement result, the corresponding report table entry that was identified at decision step 146 is deleted at step 152. On the other hand, if the state of the measurement result indicated a "bad" or "unknown" state, the report table entry identified at decision step 146 is updated to identify the current state, as indicated at step 154. After the appropriate report table entry is either deleted at step 152 or updated at step 154, the table-maintenance procedure returns to step 142.

Figure 8:
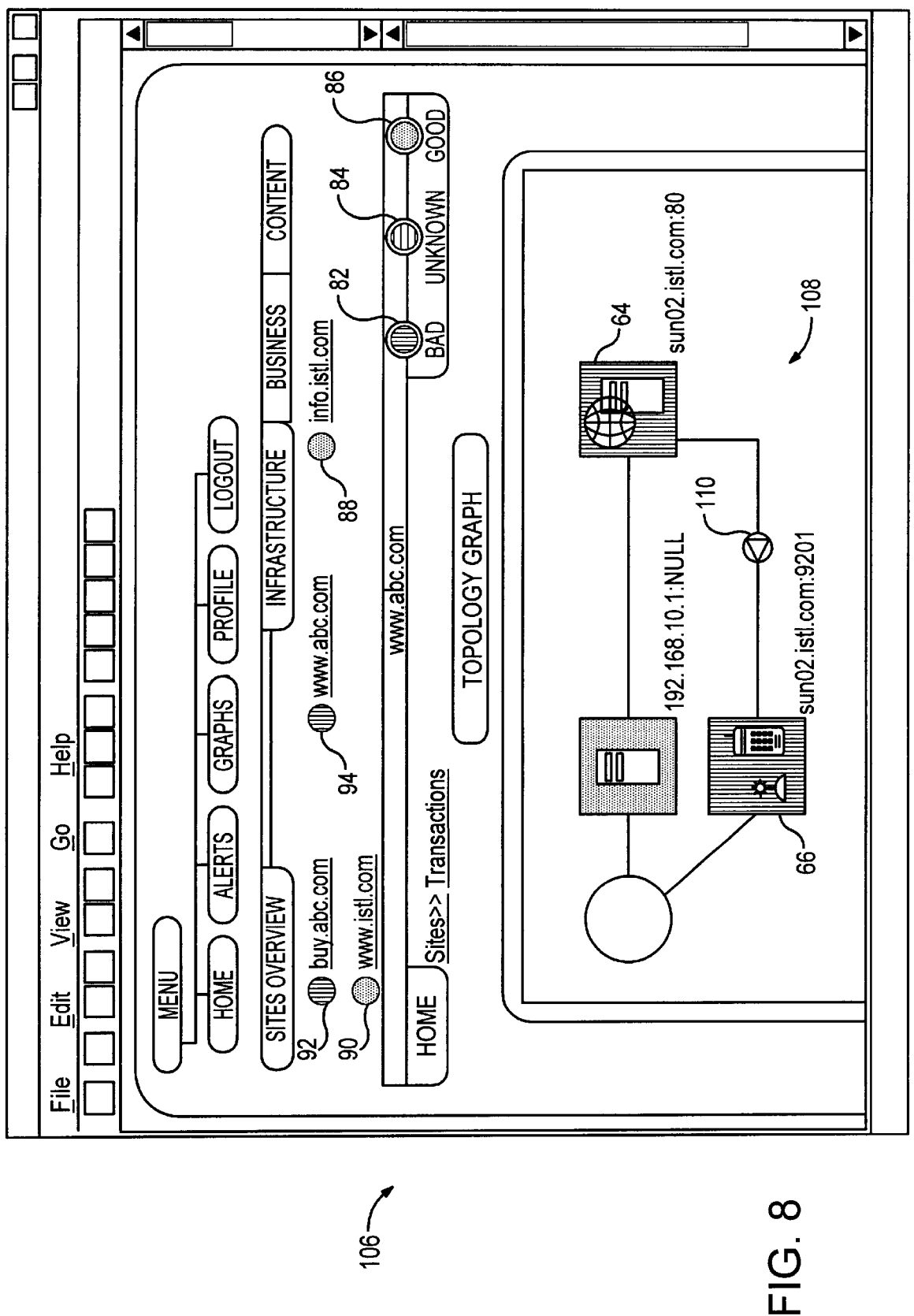
FIG. 8 is an example of the user interface with a window indicating the states of components that support the www.abc.com website.

Still referring to the manual diagnosis embodiment, the health of the network is displayed to a user of the monitoring system. For example, the representation shown in FIG. 6 may be displayed to the user by means of a web-based user interface. From the display of FIG. 6, it can be determined that the websites buy.abc.com 92 and www.abc.com 94 are "bad." The user of the monitoring system can then generate a drill-down request that is detected by the monitoring system at step 156 in FIG. 14. Thus, if the user activates the www.abc.com hyperlink in FIG. 6, the activation of the hyperlink is detected as a drill-down request and the display is reconfigured to provide the health information shown in FIG. 7. This reconfiguration is represented by steps 158, 160 and 162 in FIG. 14. At step 158, the component, layer and/or measurement to which the drill-down request pertains is determined. The report table is then accessed at step 160 in order to identify the current state or states of the component, layer and/or measurement. The display is updated at step 162 so as to be responsive to the drill-down requests detected at step 156. Continuing with the loop of steps 156-162, the topology may be graphed as shown in FIG. 8. This representation of the topology in FIG. 8 shows that both the web server 64 and the WAP gateway 66 are problematic. However, since the gateway 66 is dependent upon the web server 64 for its proper operation, it is assumed that the web server is the root cause of the problem.

Additional information regarding the root cause can be ascertained by drilling down to the health displays shown in FIGS. 9 and 10. By navigating the web-based user interface, it can be determined that the WEB_TRANSACTIONS layer is the layer of interest to correcting the problem, that the WmlPages transaction is faulty, and that the failed test relates to the average response time.

It was previously noted that there are two mechanisms in which the monitoring system facilitates determining the root cause of a problem. According to the second mechanism, the monitoring system automatically correlates across the states of measurements and determines the highest priority alarms to be identified to the user. This automated correlation approach relies on the physical and logical topologies and the component/layer/measurement mappings that were described with reference to FIGS. 3 and 12. Since the approach correlates across the various protocol layers of a component, as well as among the different components of the data network, to determine the root cause of a problem, this second mechanism may be referred to as the "top-to-bottom, end-to-end correlation approach."

Referring now to FIG. 13, although the automated correlation approach can be implemented in a separate software component of the monitoring system, since a manager 164 conventionally receives all of the health information from internal agents 166, 168, 170, 172 and 174, the manager is well suited to implement the approach. In the monitoring system, the internal agents periodically measure various metrics and then report both the actual measurements and their interpretation regarding the health of the individual measurements. The interpretations are often based upon whether threshold are exceeded, but there are other known techniques. A measurement can be interpreted as having a "good" state, a "bad" state or an "unknown" state.

Figure 16:
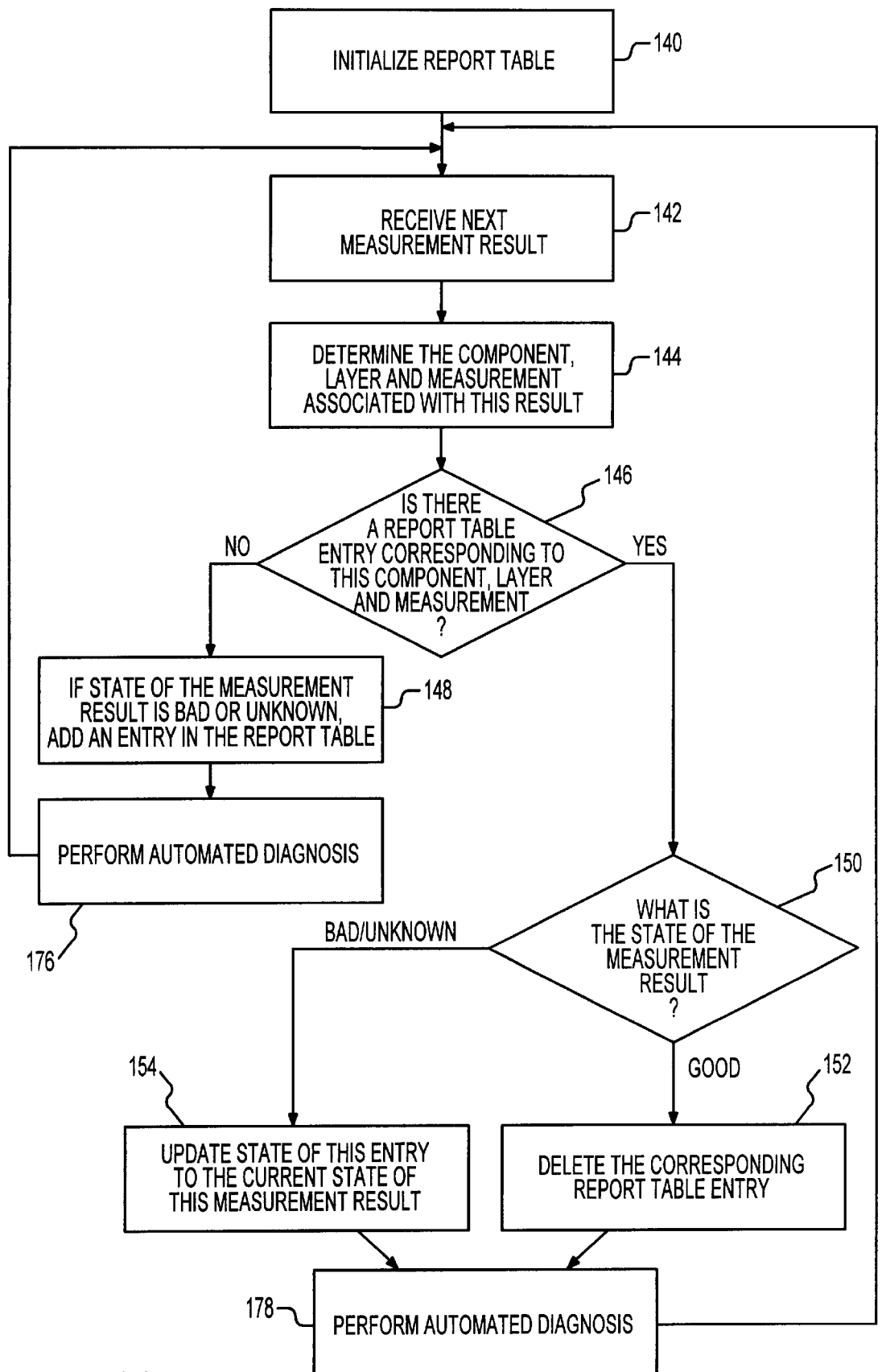
FIG. 16 is a process flow of steps for maintaining a report table in accordance with an automated embodiment of the invention.

The manager 164 maintains a report table in a manner that duplicates many of the steps described with reference to FIG. 13. The steps for maintaining the table in the automated approach are shown in FIG. 16, with steps that are identical to those described with reference to FIG. 13 being shown with duplicate reference numerals. Thus, the report table is initialized at step 140. The manager 164 receives a measurement result from one of the internal agents 152-160 or any other source of health information, as indicated at step 142. In step 144, the manager determines the component, layer and measurement associated with the received measurement result.

At decision step 146, the manager determines whether there is a report table entry that corresponds to the component, layer and measurement identified in step 144. If no entry exists and the measurement result is either "bad" or "unknown," an entry is added into the report table at step 148. Moreover, the automated diagnosis process is triggered at step 176. Returning to decision step 146, if there is a report table entry, the state of the measurement result is determined at step 150. A "good" state causes the corresponding report table entry to be deleted at step 152 and causes the automated diagnosis process to be triggered at step 178. On the other hand, when the state of the measurement result is determined to be either "bad" or "unknown," the entry is updated at step 154 and the automatic diagnosis is performed at step 178.

Figure 17:
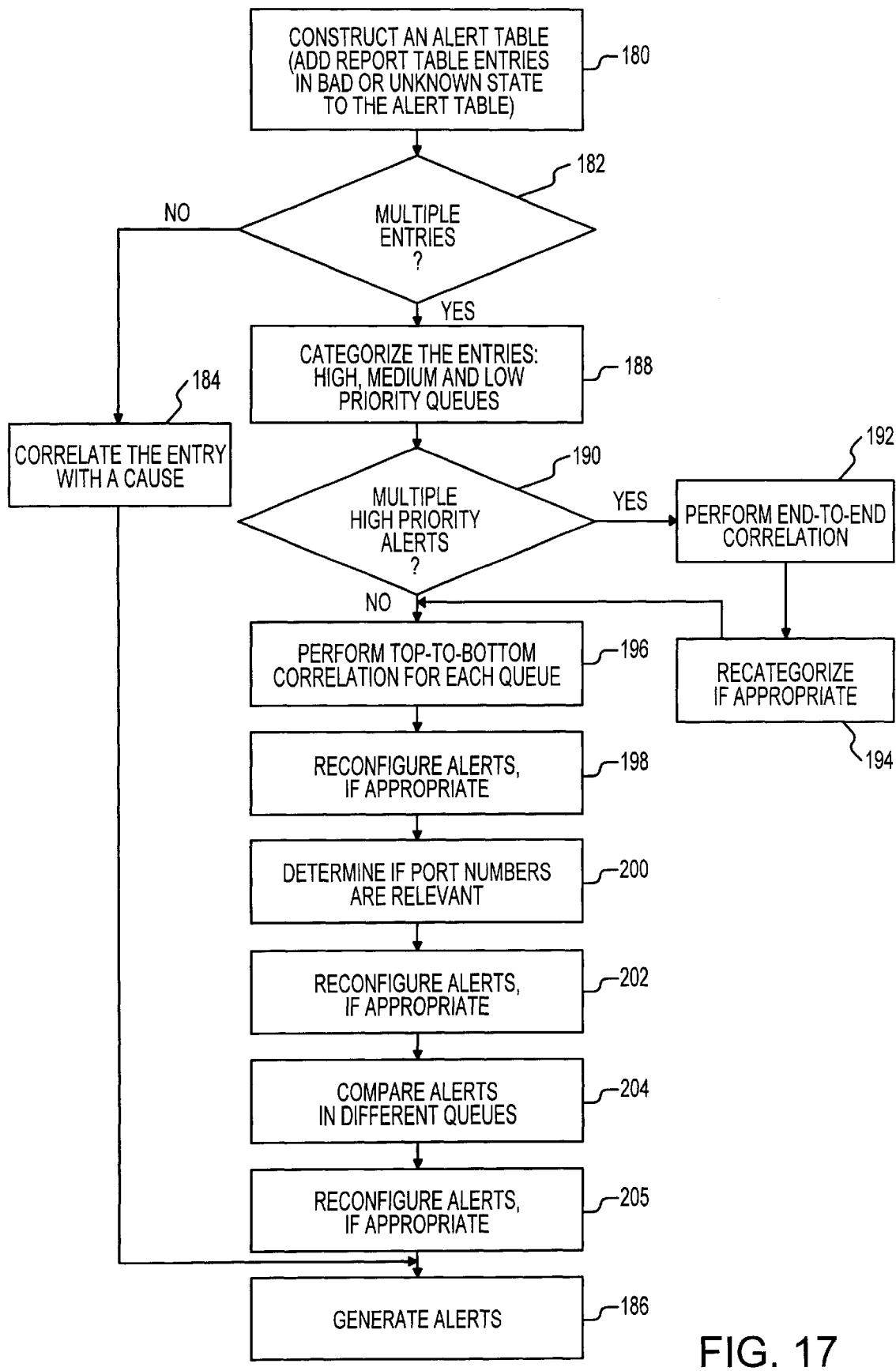
FIG. 17 is a process flow of steps for executing the automated embodiment.

The sequencing for the automated diagnosis process of steps 176 and 178 will be described with reference to FIG. 17. Firstly, an alert table is formed at step 180. The alert table includes all of the entries from the report table that are indicative of a "bad" or an "unknown" state. In decision step 182, it is determined whether there are multiple entries within the alert table. If a negative response occurs at the decision step 182 (i.e., if there is only one alert table entry), the sole entry is determined to be the root cause of the network problem at step 184. As a result, an alert is generated at step 186 to notify an operator. The notification process is not critical to the invention. As possible implementations, notice may be provided by generating an e-mail message, a pager message or a screen alert.

If it is determined at decision step 182 that there are multiple "bad" entries within the alert table, the manager 164 begins to categorize the entries into a high priority queue, a medium priority queue, and a low priority queue, as indicated at step 188. As a preliminary, the manager segregates those alerts that relate to the HOST layer from alerts for the other layers. This is because problems with the HOST layer could affect all of the other layers, but it cannot always be assumed that a problem with a host causes a problem with every layer that it supports. Hence, the host alert entries are placed in the medium priority queue. Regarding the other alert table entries, the alerts are placed in a queue that is dependent upon prior determinations. At the time of configuring the monitoring system, each measurement is associated with a priority level that indicates the severity of the alert to be generated by the manager 164 in the event that the state of the measurement is "bad." It is this prior determination that dictates the categorization of an alert.

At decision step 190, a determination is made as to whether there are multiple entries in the high priority queue. If so, the manager 164 performs end-to-end correlation at step 192. First, the manager compares each pair of alerts within the high priority queue. Each alert is preferably associated with a component type (e.g., web_server), a component name (e.g., sun02.istl.com:80), a layer (e.g., WEB_TRANSACTIONS), a website (if any), a test, and a measurement that results from the test. In the example that follows, two alert entries will be identified. For simplicity, the variables of the first alert entry will be presented in the notation [Ct1, Cn1, l1, {{s1, t1, m1}}]. Ct is the component type, Cn is the component name, l is the layer, s is the website, t is the test, and m is the measurement made by the test. Similarly, the second entry will be identified by the notation [Ct2, Cn2, l2, {{s2, t2, m2}}].

In performing the correlation of step 192, the manager 164 checks to determine whether the component [Ct1, Cn1] uses the component [Ct2, Cn2], in the physical topology. If so, the manager checks to determine if there is an overlap in terms of the websites that employ the component [Ct1, Cn1] and those that use the component [Ct2, Cn2]. In the cases in which there is no such overlap, the manager treats the two alerts as being independent of each other. However, if there is an overlap, the manager treats the alert [Ct1, Cn1, l1, {{s1, t1, m1}}] as being superseded by the alert [Ct2, Cn2, l2, {{s2, t2, m2}}]. In step 194, the first alert entry is moved from the high priority queue to the medium priority queue, but the second alert entry remains in the high priority queue.

In step 196, top-to-bottom correlation is performed for each queue. In this step, the manager 164 begins with the high priority queue, then proceeds to the medium priority queue before addressing the low priority queue. Within each queue, the manager compares every pair of alerts in that queue. Reconfiguration of the alerts may occur at step 198. The reconfiguration will follow set rules. As an example, when the manager 164 considers the two alerts [Ct1, Cn1, I1, {{s1, t1, m1}}] and [Ct2, Cn2, I2, {{s2, t2, m2}}], the manager follows the rules:

(a) If Ct1=Ct2, Cn1=Cn2, and I1=I2, instead of generating independent alerts, the manager combines the two alerts to produce a composite alert of the form [Ct1, Cn1, I1, {{s1, t1, m1},{s2, t2, m2}}].

(b) If Ct1=Ct2 and Cn1=Cn2, and I1>I2, then the manager moves the alert [Ct1, Cn1, I1, {{s1, t1, m1}}] to the next lowest priority queue. The reasoning for this reconfiguration is that problems at the higher layers of the protocol stack are often caused by problems at the lower layers of the stack.

(c) If Ct1=Ct2 and Cn1=Cn2, and I2>I1, then the manager moves the alert [Ct2, Cn2, I2, {{s2, t2, m2}}] to the next lowest priority queue. Again, the reasoning is that problems at the higher layers of the priority stack are often caused by problems at the lower layers.

A component name typically comprises a combination of a host name and a port number. In some cases the tests associated with an alert may not be specific to a port number. For example, the network test assesses the quality of the network connection to a host and is independent of any specific application (and its associated port number) executing on the host. In step 200, for each priority queue, the manager 164 considers each of the alerts within the queue and, based upon the tests associated with that alert, determines if the port number is relevant to the test under consideration. If all of the tests associated with an alert are independent of the port number, the component name associated with that alert is modified at step 202 to represent the target host name alone. Then, the manager compares every pair of alerts in a priority queue using the rules described with respect to steps 196 and 198. Optionally, the steps 200 and 202 occur prior to the execution of steps 196 and 198.

In step 204, alerts in the high priority queue are compared with alerts in the medium priority queue and the low priority queue. The manager 164 is configured to detect cases in which a similar alert may occur at two priority levels. That is, the manager detects occasions in which separate tests identify a problem with the same component name, the same component type, and the same layer. For example, it is possible that the alarm [Ct1, Cn1, I1, {{s1, t1, m1}}] occurs in a high priority queue and an alarm [Ct2, Cn2, I2, {{s2, t2, m2}}] occurs in the medium or the low priority queue. For each alert in the medium priority queue that is similar to an alert in the high priority queue, the alert is reassigned from the medium priority queue to the low priority queue. This possible reassignment occurs at step 205.

Figure 18:
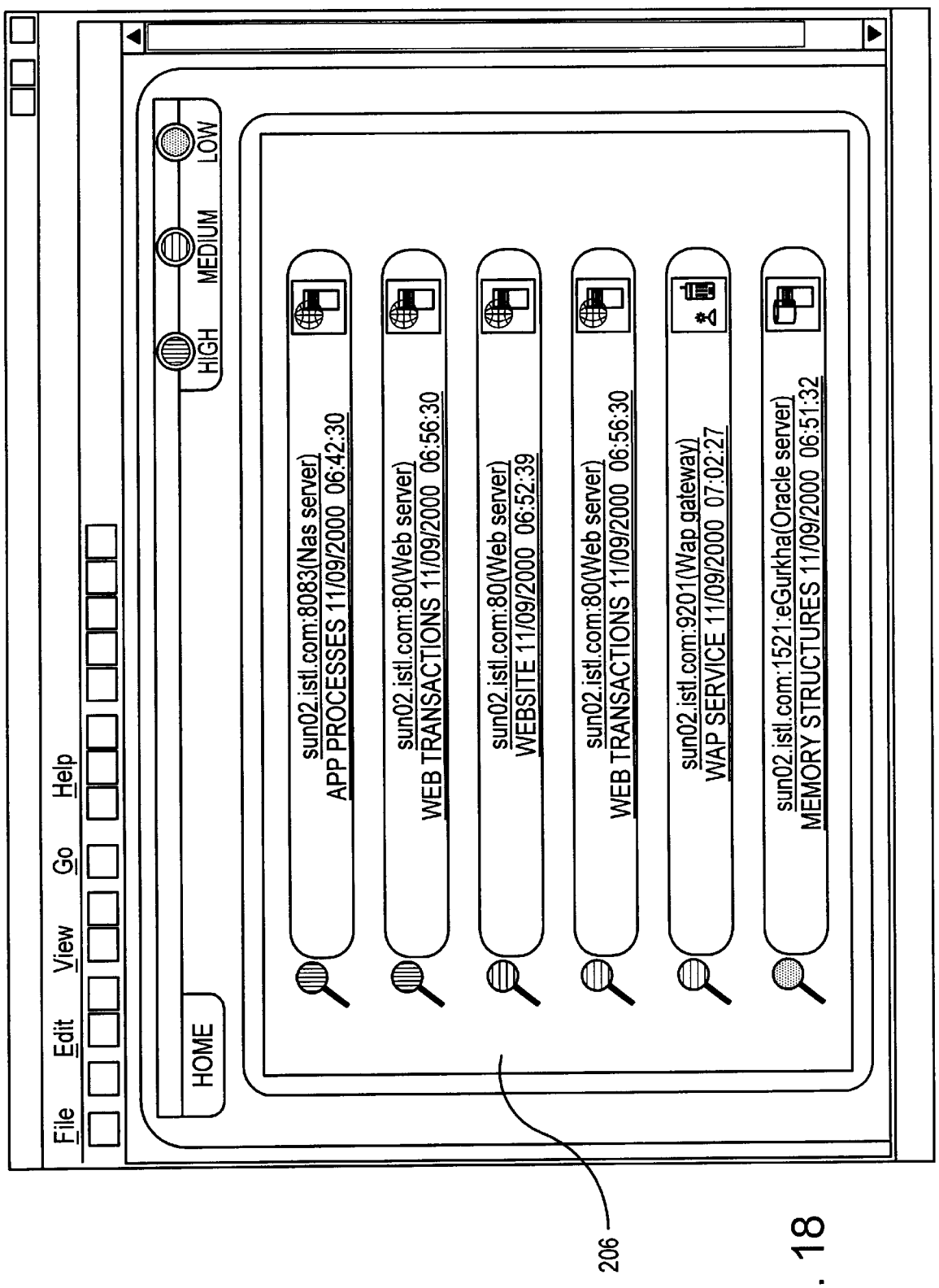
FIG. 18 is an example of a user interface that indicates the states of websites in accordance with the process of FIG. 17.

FIG. 18 illustrates the output 206 of the alarm correlation process as it is presented to a user. In this example, there are two high priority alerts, three medium priority alerts and one low priority alert. While the high priority alerts indicate independent problems that exist within the environment being monitored, the lower priority alerts represent problems that are effects of the problems indicated by the high priority alerts. A user can "click" on any alert to obtain a more detailed description of the problem associated with the alert. For example, the additional description may be information regarding the affected website, may be the test that indicated that the problem existed, or may be the measurement that was indicated as being in a "bad" state. This information provides clues as to what the operator may do to correct the situation.

A benefit of the invention is that the automatic correlation of alerts results in a report in which the perceived root causes of problems are identified with high priority alerts. Other monitoring systems that perform some correlation require users to configure complex correlation rules before the systems can effectively perform root cause analysis. A key benefit of the automatic correlation approach described herein is that no special correlation rules are required to be specified by the user. The correlation logic is embedded into the manager component of the monitoring system, so that only the specification of the physical and logical topologies of the monitored environment are required.

Another advantage of the invention is that the high priority problems reported by the manager are based on the view of the current state of the system being monitored. As current reports arrive at the manager, the manager dynamically updates the alerts, so that new alerts will be added as problems are detected, while old alerts are removed automatically as problems are addressed by operations personnel.

What is claimed is:

1. A method of monitoring a data network comprising the steps of:

storing network topology information that specifies interconnections and interdependencies among components of said data network;

defining a hierarchy of protocol layers on a basis of dependencies among said protocol layers in implementing functions utilizing said components of said data network;

associating each said protocol layer with each said component on which implementations of said functions are related, thereby associating at least some of said components with a plurality of said protocol layers;

identifying tests from which measurements are indications of health within said data network;

associating said measurements with said protocol layers on a basis of relationships between said measurements and said protocol layers; and ascertaining health of said data network, including identifying present health conditions of said protocol layers and said components on a basis of associations between said measurements and said protocol layers and on a basis of associations between said protocol layers and said components.

2. The method of claim 1 wherein said step of storing network topology information includes generating information that is representative of a physical topology and logical topologies of said data network, said physical topology being a configuration of physical connections among said components and including cause-and-effect relationships of health conditions among said components, said logical topologies including a mapping of individual websites to each said components for which said individual website is dependent for support of said individual website.

3. The method of claim 1 wherein said step of defining said hierarchy of protocol layers includes positioning a sequence of (1) a web server layer, (2) a website layer and (3) a web transaction layer in an ascending order in which higher levels in said ascending order are dependent upon support by lower levels.

4. The method of claim 1 wherein said step of associating each said protocol layer with each said component includes identifying said functions with specific said protocol layers and includes mapping each said protocol layer to specific said components which execute said functions identified with said protocol layer.

5. The method of claim 4 wherein said step of associating said measurements with said protocol layers includes mapping individual said measurements to specific said protocol layers which are mapped to specific said components, such that a particular said measurement that is determined to be undesirable is indicative of a lack of health for each said component and each said protocol layer to which said particular measurement is mapped.

6. The method of claim 5 wherein said step of ascertaining said health of said data network includes enabling a web-based user interface that displays health conditions of said components and said protocol layers mapped to said components on a basis of said measurements that are mapped to said protocol layers.

7. The method of claim 5 wherein said step of ascertaining said health of said data network includes enabling an automated correlation process which generates alerts of said lack of health in response to correlating measurements that are undesirable to components and protocol layers to which said measurements are mapped.

8. The method of claim 7 wherein said step of enabling said automated correlation process includes providing prioritization of said alerts on a basis of identifying a root cause of a problem that resulted in one or more said measurements being determined to be undesirable.

9. The method of claim 8 wherein said step of enabling said automated correlation process includes generating an alert for each said measurement that is determined to be undesirable and includes indicating the priority of said alerts in a representation of said alerts to a user.

10. The method of claim 9 wherein said step of enabling said automated correlation process includes representing said alerts as a web-based user interface that displays health conditions of said components and said protocol layers.

11. A method of monitoring a data network comprising the steps of:

mapping interconnections among components of said data network, thereby defining a physical topology;

mapping websites available via said data network to said components which support said websites, thereby defining logical topologies;

mapping functionalities of said data network to said components which enable said functionalities, including ranking said functionalities on a basis of functionality-to-functionality dependencies for implementation, thereby defining a layer hierarchy;

mapping each said component to each said functionality which said component is enabled to implement, thereby defining component-to-functionality mapping information;

mapping each of a plurality of test measurements to each said functionality for which said each test measurement is indicative of the operating state of said functionality as applied to one of said components, thereby defining measurement-to-functionality mapping information; and enabling identifications of causes of network problems based on utilizing (1) said physical topology, (2) said logical topologies, (3) said layer hierarchy, (4) said component-to-functionality mapping information and (5) said measurement-to-functionality mapping information.

12. The method of claim 11 wherein said step of enabling identifications of causes includes providing a web-based user interface that enables navigation through information indicative of present operating states of said components, present operating states of said websites, present operating states of said functionalities as mapped to said components and present states of said measurements.

13. The method of claim 11 wherein said step of enabling identifications of causes includes providing an automated process of detecting said network problems and prioritizing said network problems on a basis of said layer hierarchy and said physical and logical topologies.

14. The method of claim 13 further comprising a step of generating alerts that are responsive to prioritization of said network problems.

15. The method of claim 11 further comprising a step of mapping transactions available via said websites to those websites through which said transactions are available.

16. A method of monitoring a data network comprising the steps of:

storing first mapping information that is representative of a physical topology of network components;

storing second mapping information that is representative of a logical topology of transaction-related network access points;

storing third mapping information that is representative of network protocol layers;

storing fourth mapping information that is representative of which of said network protocol layers are implemented using which of said network components;

storing fifth mapping information that is representative of which network tests provide measurements that are indicative of states of which protocol layers in which components; and enabling detection of network problems using said first, second, third, fourth and fifth mapping information.

17. The method of claim 16 wherein said step of storing said second mapping information includes identifying websites as said transaction-related network access points and includes mapping transactions to said websites at which said transactions are available.

18. The method of claim 16 wherein said step of storing said third mapping information includes identifying a hierarchy of said network protocol layers on a basis of dependencies of said network protocol layers.

19. The method of claim 16 wherein said step of enabling detection includes providing a web-based user interface that allows navigation through said first, second, third, fourth and fifth mapping information.

20. The method of claim 16 wherein said step of enabling detection includes providing an automated process that prioritizes said network problems and generates alerts that are responsive to prioritization.

* * * * *